United States Patent
Sugio et al.

(10) Patent No.: US 11,551,408 B2
(45) Date of Patent: Jan. 10, 2023

(54) THREE-DIMENSIONAL MODEL DISTRIBUTION METHOD, THREE-DIMENSIONAL MODEL RECEIVING METHOD, THREE-DIMENSIONAL MODEL DISTRIBUTION DEVICE, AND THREE-DIMENSIONAL MODEL RECEIVING DEVICE

(71) Applicant: Panasonic Intellectual Property Corporation of America, Torrance, CA (US)

(72) Inventors: Toshiyasu Sugio, Osaka (JP); Toru Matsunobu, Osaka (JP); Satoshi Yoshikawa, Hyogo (JP); Tatsuya Koyama, Kyoto (JP); Yoichi Sugino, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/449,651

(22) Filed: Jun. 24, 2019

(65) Prior Publication Data

US 2019/0311526 A1 Oct. 10, 2019

Related U.S. Application Data

(63) Continuation of application No. PCT/JP2017/045912, filed on Dec. 21, 2017.
(Continued)

(51) Int. Cl.
*G06T 15/20* (2011.01)
*G06T 9/00* (2006.01)
(Continued)

(52) U.S. Cl.
CPC ............. *G06T 15/205* (2013.01); *G06T 9/00* (2013.01); *G06T 19/20* (2013.01); *H04N 13/117* (2018.05);
(Continued)

(58) Field of Classification Search
CPC ..... G06T 2210/41; G06T 15/205; G06T 9/00; G06T 19/20; G06T 2219/2012;
(Continued)

(56) References Cited

U.S. PATENT DOCUMENTS 4,953,101 A * 8/1990 Kelleher ................. G09G 5/39
345/564
5,424,755 A * 6/1995 Lucas ..................... G09G 5/02
358/518

(Continued)

FOREIGN PATENT DOCUMENTS

EP    1 587 329    10/2005
JP    9-237354    9/1997
(Continued)

OTHER PUBLICATIONS

D. Miao, J. Fu, Y. Lu, S. Li and C. W. Chen, "Layered compression for high-precision depth data," in IEEE Transactions on Image Processing, vol. 24, No. 12, pp. 5492-5504, Dec. 2015, doi: 10.1109/TIP.2015.2481324. (Year: 2015).*

(Continued)

*Primary Examiner* — Charles L Beard
(74) *Attorney, Agent, or Firm* — Wenderoth, Lind & Ponack, L.L.P.

(57) ABSTRACT

A three-dimensional model distribution method includes generating a depth image from a three-dimensional model; and distributing the depth image and information for restoring the three-dimensional model from the depth image.

22 Claims, 23 Drawing Sheets

Related U.S. Application Data

(60) Provisional application No. 62/439,646, filed on Dec. 28, 2016.

(51) Int. Cl.
| | |
|---|---|
| *G06T 19/20* | (2011.01) |
| *H04N 13/161* | (2018.01) |
| *H04N 13/194* | (2018.01) |
| *H04N 13/117* | (2018.01) |
| *H04N 21/2343* | (2011.01) |
| *H04N 13/279* | (2018.01) |
| *H04N 19/597* | (2014.01) |
| *H04N 13/243* | (2018.01) |
| *H04N 13/246* | (2018.01) |
| *H04N 13/00* | (2018.01) |

(52) U.S. Cl.
CPC ......... *H04N 13/161* (2018.05); *H04N 13/194* (2018.05); *H04N 13/279* (2018.05); *H04N 19/597* (2014.11); *H04N 21/2343* (2013.01); *G06T 2219/2012* (2013.01); *H04N 13/243* (2018.05); *H04N 13/246* (2018.05); *H04N 2013/0081* (2013.01)

(58) Field of Classification Search
CPC .. H04N 19/597; H04N 13/279; H04N 13/117; H04N 13/194; H04N 13/161; H04N 21/2343; H04N 13/246; H04N 13/243; H04N 2013/0081
See application file for complete search history.

(56) References Cited

U.S. PATENT DOCUMENTS

| | | | | |
|---|---|---|---|---|
| 5,757,376 A * | 5/1998 | Suzuoki | G06T 15/87 | 345/581 |
| 5,774,133 A * | 6/1998 | Neave | G06T 17/00 | 345/503 |
| 5,841,439 A * | 11/1998 | Pose | G06T 15/005 | 345/422 |
| 5,850,226 A * | 12/1998 | Nagasawa | G06T 15/10 | 345/428 |
| 5,850,352 A * | 12/1998 | Moezzi | H04N 13/139 | 345/419 |
| 5,978,551 A * | 11/1999 | Koyama | H04N 1/32122 | 358/1.9 |
| 6,184,888 B1 * | 2/2001 | Yuasa | G06T 15/10 | 345/419 |
| 6,215,898 B1 * | 4/2001 | Woodfill | G06T 7/593 | 348/E13.016 |
| 6,288,722 B1 * | 9/2001 | Narayanaswami | G09G 5/399 | 345/473 |
| 6,525,731 B1 * | 2/2003 | Suits | G06T 15/04 | 345/421 |
| 6,552,721 B1 * | 4/2003 | Ishikawa | G06T 17/005 | 715/848 |
| 6,650,782 B1 * | 11/2003 | Joshi | H04N 19/129 | 375/E7.056 |
| 6,850,649 B1 * | 2/2005 | Malvar | H04N 19/93 | 382/233 |
| 7,030,877 B1 * | 4/2006 | Sell | G06T 15/405 | 345/422 |
| 7,133,041 B2 * | 11/2006 | Kaufman | G06T 15/06 | 345/419 |
| 7,376,279 B2 * | 5/2008 | Dekel | G06Q 50/22 | 382/240 |
| 7,403,201 B2 * | 7/2008 | Takemoto | H04N 13/194 | 348/51 |
| 7,492,391 B1 * | 2/2009 | Kaplinsky | G06T 5/50 | 348/211.3 |
| 7,551,172 B2 * | 6/2009 | Yaron | G06Q 30/02 | 345/428 |
| 7,644,131 B2 * | 1/2010 | Levanon | G06T 3/403 | 709/217 |
| 7,660,355 B2 * | 2/2010 | Winger | H04N 19/40 | 375/240.03 |
| 7,663,689 B2 * | 2/2010 | Marks | H04N 5/2226 | 348/370 |
| 7,683,937 B1 * | 3/2010 | Blumenfeld | H04N 5/23203 | 348/211.11 |
| 7,882,421 B2 * | 2/2011 | Oguz | H03M 13/2927 | 714/776 |
| 7,978,921 B1 * | 7/2011 | Donovan | H04N 19/98 | 708/203 |
| 8,326,023 B2 * | 12/2012 | Sawachi | H04N 13/257 | 382/154 |
| 8,488,870 B2 * | 7/2013 | Martinez-Bauza | H04N 13/271 | 382/154 |
| 8,532,383 B1 * | 9/2013 | Thakkar | G06T 1/00 | 382/173 |
| 8,612,196 B2 * | 12/2013 | Rosedale | G06F 30/20 | 703/13 |
| 8,824,752 B1 * | 9/2014 | Fonte | G06T 7/0012 | 382/126 |
| 8,953,684 B2 * | 2/2015 | Cai | H04N 19/597 | 375/240.16 |
| 9,020,241 B2 * | 4/2015 | Leichsenring | G06T 19/00 | 382/154 |
| 9,047,669 B1 * | 6/2015 | Ostiguy | H04N 19/174 | |
| 9,055,277 B2 * | 6/2015 | Katayama | H04N 13/128 | |
| 9,161,012 B2 * | 10/2015 | Mihelich | H04N 19/20 | |
| 9,264,765 B2 * | 2/2016 | Sasaki | H04N 21/6175 | |
| 9,406,132 B2 * | 8/2016 | Martinez Bauza | H04N 19/42 | |
| 9,419,648 B1 * | 8/2016 | Guilford | H03M 7/40 | |
| 9,426,438 B2 * | 8/2016 | Furukawa | H04N 5/2355 | |
| 9,509,917 B2 * | 11/2016 | Blanquart | H04N 5/35554 | |
| 9,516,239 B2 * | 12/2016 | Blanquart | A61B 1/045 | |
| 9,530,226 B2 * | 12/2016 | Kozak | G06T 9/40 | |
| 9,531,958 B2 * | 12/2016 | Kasai | H04N 5/2353 | |
| 9,635,341 B2 * | 4/2017 | Sudo | G06F 3/147 | |
| 9,648,346 B2 * | 5/2017 | Zhang | H04N 19/54 | |
| 9,672,066 B2 * | 6/2017 | Arun | G06F 9/4881 | |
| 9,677,840 B2 * | 6/2017 | Rublowsky | F41A 33/00 | |
| 9,736,462 B2 * | 8/2017 | Weinstock | H04N 13/296 | |
| 9,741,091 B2 * | 8/2017 | Satori | H04N 21/2187 | |
| 9,832,447 B2 * | 11/2017 | Konno | G06T 3/00 | |
| 9,929,748 B1 * | 3/2018 | Gopal | H03M 7/6041 | |
| 9,934,823 B1 * | 4/2018 | Bentley | G11B 27/3081 | |
| 9,990,767 B1 * | 6/2018 | Sheffield | G01B 11/245 | |
| 10,049,427 B1 * | 8/2018 | Lachowsky | H04N 19/91 | |
| 10,085,002 B2 * | 9/2018 | Cho | G06T 7/50 | |
| 10,089,774 B2 * | 10/2018 | Kallio | G06T 15/005 | |
| 10,129,569 B2 * | 11/2018 | Ortiz | A63B 71/06 | |
| 10,191,912 B2 * | 1/2019 | Shih | H03M 7/3084 | |
| 10,281,979 B2 * | 5/2019 | Oyama | G06F 3/013 | |
| 10,298,903 B2 * | 5/2019 | Gerard | G09G 3/001 | |
| 10,306,212 B2 * | 5/2019 | Luo | H04N 13/296 | |
| 10,319,071 B2 * | 6/2019 | Van Der Auwera | G06T 3/4038 | |
| 10,341,660 B2 * | 7/2019 | Tanizawa | H04N 21/2402 | |
| 10,360,695 B1 * | 7/2019 | Jean | H04N 19/137 | |
| 10,380,798 B2 * | 8/2019 | He | A63F 13/65 | |
| 10,404,938 B1 * | 9/2019 | De Benoist | H04N 7/15 | |
| 10,430,995 B2 * | 10/2019 | Holzer | H04N 5/265 | |
| 10,453,249 B2 * | 10/2019 | Smirnov | G06T 7/557 | |
| 10,475,315 B2 * | 11/2019 | Madar | G08B 13/1968 | |
| 10,491,863 B2 * | 11/2019 | Yoneji | G06K 9/00744 | |
| 10,491,886 B2 * | 11/2019 | Aflaki Beni | G01S 17/87 | |
| 10,500,479 B1 * | 12/2019 | Malik | A63F 13/00 | |
| 10,540,773 B2 * | 1/2020 | Holzer | H04N 5/23238 | |
| 10,540,824 B1 * | 1/2020 | Maitlen | G06T 19/20 | |
| 10,558,844 B2 * | 2/2020 | D'Ercoli | G06T 7/75 | |
| 10,645,360 B2 * | 5/2020 | Kern, II | H04N 5/247 | |
| 10,694,210 B2 * | 6/2020 | Chou | H04N 19/124 | |
| 10,785,485 B1 * | 9/2020 | Girard | H04N 19/146 | |
| 10,839,589 B2 * | 11/2020 | Cilingir | G06T 9/001 | |
| 10,841,555 B2 * | 11/2020 | Taya | H04N 5/2353 | |
| 10,855,965 B1 * | 12/2020 | Jiao | H04N 13/383 | |
| 10,944,960 B2 * | 3/2021 | Matsunobu | H04N 13/194 | |

(56) References Cited

U.S. PATENT DOCUMENTS

| | | | |
|---|---|---|---|
| 11,070,813 B2* | 7/2021 | Socek | H04N 19/137 |
| 11,290,710 B1* | 3/2022 | Brown | G06T 11/001 |
| 2002/0116424 A1* | 8/2002 | Radermacher | G06F 9/4401 |
| | | | 708/203 |
| 2002/0159632 A1* | 10/2002 | Chui | G06T 9/00 |
| | | | 382/246 |
| 2003/0007695 A1* | 1/2003 | Bossut | G06T 9/00 |
| | | | 382/239 |
| 2003/0048954 A1* | 3/2003 | Matthews | G06T 9/00 |
| | | | 382/240 |
| 2003/0093341 A1* | 5/2003 | Millard | G06Q 30/04 |
| | | | 705/34 |
| 2003/0214502 A1* | 11/2003 | Park | G06T 15/405 |
| | | | 345/419 |
| 2003/0235341 A1* | 12/2003 | Gokturk | G06T 9/001 |
| | | | 382/173 |
| 2004/0128592 A1* | 7/2004 | Park | H04L 25/067 |
| | | | 714/709 |
| 2004/0136602 A1* | 7/2004 | Nagaraj | H04N 19/154 |
| | | | 375/E7.044 |
| 2004/0153671 A1* | 8/2004 | Schuyler | G07C 9/00 |
| | | | 726/9 |
| 2005/0093873 A1* | 5/2005 | Paltashev | G06T 9/00 |
| | | | 345/581 |
| 2005/0117019 A1* | 6/2005 | Lamboray | H04N 19/20 |
| | | | 348/E13.062 |
| 2006/0050383 A1* | 3/2006 | Takemoto | H04N 13/194 |
| | | | 348/E13.02 |
| 2006/0140473 A1* | 6/2006 | Brooksby | G06T 7/33 |
| | | | 382/285 |
| 2006/0245014 A1* | 11/2006 | Haneda | H04N 1/3871 |
| | | | 358/512 |
| 2007/0011302 A1* | 1/2007 | Groner | H04L 69/163 |
| | | | 709/224 |
| 2007/0024879 A1* | 2/2007 | Hamilton | H04N 9/045 |
| | | | 358/1.9 |
| 2007/0024931 A1* | 2/2007 | Compton | H04N 9/045 |
| | | | 358/512 |
| 2007/0122027 A1* | 5/2007 | Kunita | G06T 7/593 |
| | | | 382/154 |
| 2007/0167801 A1* | 7/2007 | Webler | G06T 19/00 |
| | | | 600/459 |
| 2007/0204011 A1* | 8/2007 | Shaver | H04N 21/4782 |
| | | | 709/219 |
| 2007/0279494 A1* | 12/2007 | Aman | H04N 5/278 |
| | | | 348/169 |
| 2008/0100612 A1* | 5/2008 | Dastmalchi | A61B 3/102 |
| | | | 345/418 |
| 2008/0267522 A1* | 10/2008 | Kobayashi | G06T 5/009 |
| | | | 382/254 |
| 2009/0006510 A1* | 1/2009 | Laker | H03M 7/3086 |
| | | | 708/203 |
| 2009/0041021 A1* | 2/2009 | Meany | H03M 7/00 |
| | | | 370/394 |
| 2009/0041338 A1* | 2/2009 | Sawachi | H04N 13/239 |
| | | | 382/154 |
| 2009/0059048 A1* | 3/2009 | Luo | H04N 5/2353 |
| | | | 348/308 |
| 2009/0113505 A1* | 4/2009 | Yu | H04N 7/17318 |
| | | | 725/114 |
| 2009/0129466 A1* | 5/2009 | Cho | H04N 19/103 |
| | | | 375/240.03 |
| 2009/0142041 A1* | 6/2009 | Nagasawa | H04N 13/356 |
| | | | 386/341 |
| 2009/0161989 A1* | 6/2009 | Sim | H04N 19/124 |
| | | | 382/285 |
| 2009/0167785 A1* | 7/2009 | Wong | G06T 15/503 |
| | | | 345/629 |
| 2009/0219283 A1* | 9/2009 | Hendrickson | H04N 13/128 |
| | | | 345/420 |
| 2009/0238286 A1* | 9/2009 | Kim | H04N 19/182 |
| | | | 375/240.27 |
| 2009/0244066 A1* | 10/2009 | Sugita | H04N 13/282 |
| | | | 345/427 |
| 2009/0290052 A1* | 11/2009 | Liu | H04N 5/35554 |
| | | | 348/277 |
| 2010/0115452 A1* | 5/2010 | Chabot | G06F 16/957 |
| | | | 715/779 |
| 2010/0251293 A1* | 9/2010 | Riggert | H04N 21/4223 |
| | | | 370/468 |
| 2010/0277631 A1* | 11/2010 | Sugiyama | H04N 5/35581 |
| | | | 348/297 |
| 2010/0315534 A1* | 12/2010 | Azuma | H04N 5/35545 |
| | | | 348/234 |
| 2011/0018864 A1* | 1/2011 | Ishibashi | G06T 15/20 |
| | | | 345/419 |
| 2011/0037833 A1* | 2/2011 | Lee | H04N 13/183 |
| | | | 348/46 |
| 2011/0043613 A1* | 2/2011 | Rohaly | A61C 13/0004 |
| | | | 348/50 |
| 2011/0044664 A1* | 2/2011 | Yukawa | H04N 13/189 |
| | | | 348/43 |
| 2011/0058593 A1* | 3/2011 | Chiang | H04L 7/10 |
| | | | 375/219 |
| 2011/0119709 A1* | 5/2011 | Kim | H04N 21/2365 |
| | | | 348/42 |
| 2011/0137156 A1* | 6/2011 | Razzaque | A61B 18/1477 |
| | | | 600/424 |
| 2011/0199487 A1* | 8/2011 | Husoy | G05B 19/418 |
| | | | 348/159 |
| 2011/0242368 A1* | 10/2011 | Haneda | H04N 5/235 |
| | | | 348/239 |
| 2011/0279705 A1* | 11/2011 | Kuang | H04N 5/343 |
| | | | 348/229.1 |
| 2012/0020413 A1* | 1/2012 | Chen | H04N 19/61 |
| | | | 375/240.26 |
| 2012/0057783 A1* | 3/2012 | Yamada | G06T 7/194 |
| | | | 382/165 |
| 2012/0062746 A1* | 3/2012 | Otsuka | H04N 7/18 |
| | | | 348/148 |
| 2012/0090005 A1* | 4/2012 | Marlow | G06Q 30/0241 |
| | | | 725/42 |
| 2012/0114045 A1* | 5/2012 | Teng | H04N 19/174 |
| | | | 375/E7.026 |
| 2012/0120194 A1* | 5/2012 | Newton | H04N 13/398 |
| | | | 348/43 |
| 2012/0127337 A1* | 5/2012 | Okada | H04N 5/35509 |
| | | | 348/223.1 |
| 2012/0170664 A1* | 7/2012 | Hasui | H04N 1/41 |
| | | | 375/240.24 |
| 2012/0224774 A1* | 9/2012 | Lim | H04N 19/426 |
| | | | 382/233 |
| 2012/0287156 A1* | 11/2012 | Tsujita | A61B 8/06 |
| | | | 345/629 |
| 2012/0289836 A1* | 11/2012 | Ukimura | A61B 8/14 |
| | | | 600/463 |
| 2012/0306876 A1* | 12/2012 | Shotton | G06T 17/10 |
| | | | 345/424 |
| 2012/0307068 A1* | 12/2012 | Feinson | H04N 13/243 |
| | | | 348/159 |
| 2013/0039593 A1* | 2/2013 | Komiya | H04N 19/13 |
| | | | 382/233 |
| 2013/0044108 A1* | 2/2013 | Tanaka | G06T 15/04 |
| | | | 345/419 |
| 2013/0044183 A1* | 2/2013 | Jeon | H04N 19/103 |
| | | | 375/240.03 |
| 2013/0057547 A1* | 3/2013 | Hwang | G06T 17/00 |
| | | | 345/420 |
| 2013/0071012 A1* | 3/2013 | Leichsenring | G06K 9/80 |
| | | | 382/154 |
| 2013/0089257 A1* | 4/2013 | Kim | G06T 1/0028 |
| | | | 382/170 |
| 2013/0100132 A1* | 4/2013 | Katayama | H04N 13/275 |
| | | | 345/420 |
| 2013/0101037 A1* | 4/2013 | Chono | H04N 19/182 |
| | | | 375/240.12 |
| 2013/0128083 A1* | 5/2013 | Liu | H04N 13/257 |
| | | | 348/262 |

(56) References Cited

U.S. PATENT DOCUMENTS

| | | | |
|---|---|---|---|
| 2013/0162643 A1* | 6/2013 | Cardie | G06T 17/00 345/420 |
| 2013/0182077 A1* | 7/2013 | Holz | G06V 10/40 348/46 |
| 2013/0182902 A1* | 7/2013 | Holz | G02B 27/0172 382/103 |
| 2013/0194255 A1* | 8/2013 | Lee | H04N 13/161 345/419 |
| 2013/0265462 A1* | 10/2013 | Kano | H04N 5/23229 348/223.1 |
| 2013/0278617 A1* | 10/2013 | Strom | G06T 9/005 345/545 |
| 2013/0279600 A1* | 10/2013 | Toma | H04N 19/13 375/240.25 |
| 2013/0286160 A1* | 10/2013 | Sasaki | H04N 13/161 348/43 |
| 2013/0293539 A1* | 11/2013 | Hunt | G01B 11/00 345/420 |
| 2013/0308056 A1* | 11/2013 | Kim | H04N 19/67 348/617 |
| 2013/0315308 A1* | 11/2013 | Sugio | H04N 19/159 375/240.14 |
| 2013/0315473 A1* | 11/2013 | Takahashi | H04N 13/111 382/103 |
| 2013/0321586 A1* | 12/2013 | Kirk | H04N 13/257 348/47 |
| 2013/0322689 A1* | 12/2013 | Carmichael | G06K 9/00711 382/103 |
| 2013/0336592 A1* | 12/2013 | Matsunobu | G06T 9/00 382/239 |
| 2013/0343660 A1* | 12/2013 | Kim | H04N 19/103 382/232 |
| 2014/0002605 A1* | 1/2014 | Liao | G06T 7/593 348/46 |
| 2014/0027613 A1* | 1/2014 | Smith | H04N 5/2352 250/208.1 |
| 2014/0056577 A1* | 2/2014 | Ogawa | G11B 20/10527 386/329 |
| 2014/0072239 A1* | 3/2014 | Alakuijala | G06T 9/004 382/238 |
| 2014/0085537 A1* | 3/2014 | Chujoh | H04N 19/85 348/453 |
| 2014/0104289 A1* | 4/2014 | Nakayama | H04N 19/593 345/545 |
| 2014/0112389 A1* | 4/2014 | Wahadaniah | H04N 19/597 375/240.12 |
| 2014/0119433 A1* | 5/2014 | Park | H04N 19/132 375/240.02 |
| 2014/0122381 A1* | 5/2014 | Nowozin | G06N 20/00 706/12 |
| 2014/0140416 A1* | 5/2014 | Yamazaki | H04N 19/82 375/240.25 |
| 2014/0146892 A1* | 5/2014 | Sugio | H04N 19/597 375/240.16 |
| 2014/0147040 A1* | 5/2014 | Tanaka | G06T 9/00 382/166 |
| 2014/0169480 A1* | 6/2014 | Lachine | H04N 19/176 382/246 |
| 2014/0176799 A1* | 6/2014 | Kondo | H04N 17/004 348/575 |
| 2014/0177971 A1* | 6/2014 | Strom | H04N 19/91 382/232 |
| 2014/0185923 A1* | 7/2014 | Chen | G06K 9/00201 382/154 |
| 2014/0211856 A1* | 7/2014 | Sugio | H04N 19/70 375/240.16 |
| 2014/0212014 A1* | 7/2014 | Kim | G06T 3/0068 382/131 |
| 2014/0232822 A1* | 8/2014 | Venkataraman | H04N 5/225 348/43 |
| 2014/0247983 A1* | 9/2014 | MacInnis | H04N 19/186 382/166 |
| 2014/0285626 A1* | 9/2014 | Fu | H04N 13/161 348/46 |
| 2014/0307098 A1* | 10/2014 | Kang | H04N 13/254 348/164 |
| 2014/0341464 A1* | 11/2014 | Fan | G06T 5/008 382/154 |
| 2014/0362078 A1* | 12/2014 | Yamada | G06T 15/00 345/419 |
| 2015/0023416 A1* | 1/2015 | Tanaka | H04N 19/50 375/240.08 |
| 2015/0029190 A1* | 1/2015 | Ishida | G01R 29/0871 345/420 |
| 2015/0085926 A1* | 3/2015 | Komiya | H04N 19/597 375/240.12 |
| 2015/0109304 A1* | 4/2015 | Isokawa | A61B 6/461 345/427 |
| 2015/0109415 A1* | 4/2015 | Son | G01B 11/22 348/46 |
| 2015/0109513 A1* | 4/2015 | Nayar | H04N 5/23212 348/349 |
| 2015/0125034 A1* | 5/2015 | Tateno | G06T 7/75 382/103 |
| 2015/0150526 A1* | 6/2015 | Oh | A61B 6/463 378/62 |
| 2015/0172622 A1* | 6/2015 | Yoon | G09G 3/3406 345/694 |
| 2015/0172713 A1* | 6/2015 | Komiya | H04N 19/577 375/240.15 |
| 2015/0172714 A1* | 6/2015 | Wu | H04N 19/597 375/240.12 |
| 2015/0201176 A1* | 7/2015 | Graziosi | H04N 13/111 348/43 |
| 2015/0221105 A1* | 8/2015 | Tripathi | G06T 19/00 382/131 |
| 2015/0249838 A1* | 9/2015 | Chang | H04N 19/597 375/240.16 |
| 2015/0254852 A1* | 9/2015 | Yamato | A61B 6/5288 345/634 |
| 2015/0262384 A1* | 9/2015 | Motomura | G06T 7/0012 348/79 |
| 2015/0288950 A1* | 10/2015 | Zhang | H04N 5/33 348/47 |
| 2015/0288963 A1* | 10/2015 | Sato | H04N 19/593 375/240.14 |
| 2015/0289848 A1* | 10/2015 | Hwang | A61B 5/1128 600/411 |
| 2015/0297949 A1* | 10/2015 | Aman | G06T 7/246 348/157 |
| 2015/0310650 A1* | 10/2015 | Lu | G01R 33/5608 324/322 |
| 2015/0317822 A1* | 11/2015 | Haimovitch-Yogev | H04N 13/194 345/419 |
| 2015/0324955 A1* | 11/2015 | Cawley | H04N 1/3877 345/649 |
| 2015/0332448 A1* | 11/2015 | Zhang | G01V 5/005 382/103 |
| 2015/0332461 A1* | 11/2015 | Kim | A61B 8/5261 382/131 |
| 2015/0334276 A1* | 11/2015 | Ecker | A61B 1/00009 348/76 |
| 2015/0381968 A1* | 12/2015 | Arora | G06T 17/00 348/47 |
| 2015/0382025 A1* | 12/2015 | Gu | H04N 19/597 375/240.24 |
| 2016/0012633 A1* | 1/2016 | Wei | G06T 17/05 345/420 |
| 2016/0012647 A1* | 1/2016 | Chen | G01V 5/0008 382/203 |
| 2016/0027184 A1* | 1/2016 | Courtney | G06T 15/08 345/424 |
| 2016/0027206 A1* | 1/2016 | Beach | G02B 21/10 382/128 |
| 2016/0037166 A1* | 2/2016 | Mammou | H04N 19/139 382/236 |

(56) References Cited

U.S. PATENT DOCUMENTS

| | | | |
|---|---|---|---|
| 2016/0042537 A1* | 2/2016 | Ng | G06T 11/005 382/131 |
| 2016/0086385 A1* | 3/2016 | Gourlay | G06T 19/20 382/154 |
| 2016/0094829 A1* | 3/2016 | Georgiev | H04N 19/46 348/43 |
| 2016/0100171 A1* | 4/2016 | Karczewicz | H04N 19/176 375/240.02 |
| 2016/0105636 A1* | 4/2016 | Guo | H04N 7/15 348/14.15 |
| 2016/0117823 A1* | 4/2016 | Isaacs | A61B 6/547 715/863 |
| 2016/0125568 A1* | 5/2016 | Jeacocke | G09G 5/001 345/531 |
| 2016/0127728 A1* | 5/2016 | Tanizawa | H04N 19/30 375/240.02 |
| 2016/0146595 A1* | 5/2016 | Boufounos | G01S 17/89 348/47 |
| 2016/0163101 A1* | 6/2016 | Jang | G06T 17/205 382/131 |
| 2016/0191887 A1* | 6/2016 | Casas | G02B 27/0172 348/47 |
| 2016/0196804 A1* | 7/2016 | Skinner | H04N 19/156 345/543 |
| 2016/0198103 A1* | 7/2016 | Tanaka | H04N 9/045 348/164 |
| 2016/0205359 A1* | 7/2016 | Hirota | H04N 9/045 348/280 |
| 2016/0234474 A1* | 8/2016 | Zhang | G06T 7/593 |
| 2016/0253800 A1* | 9/2016 | Gurevich | G06T 7/0016 382/128 |
| 2016/0296120 A1* | 10/2016 | Miyasa | A61B 5/0095 |
| 2016/0323559 A1* | 11/2016 | Matsunobu | H04N 13/296 |
| 2016/0350960 A1* | 12/2016 | Yi | G06T 15/06 |
| 2016/0366396 A1* | 12/2016 | Kim | G06T 7/70 |
| 2016/0373613 A1* | 12/2016 | Kelly | G06T 9/00 |
| 2017/0003764 A1* | 1/2017 | Li | G06T 19/006 |
| 2017/0070753 A1* | 3/2017 | Kaneko | H04N 19/146 |
| 2017/0085733 A1* | 3/2017 | Ilic | H04N 1/00827 |
| 2017/0116933 A1* | 4/2017 | Xu | G09G 3/3607 |
| 2017/0127046 A1* | 5/2017 | Das | G06T 5/002 |
| 2017/0186179 A1* | 6/2017 | Miyano | G06T 7/20 |
| 2017/0188002 A1* | 6/2017 | Chan | G06V 10/28 |
| 2017/0206441 A1* | 7/2017 | Miyano | H04N 7/18 |
| 2017/0206679 A1* | 7/2017 | Pansiot | A61B 5/0035 |
| 2017/0215713 A1* | 8/2017 | Takahashi | H04N 7/18 |
| 2017/0235497 A1* | 8/2017 | Shih | G06F 3/0608 711/154 |
| 2017/0287165 A1* | 10/2017 | Lam | G06T 7/251 |
| 2017/0339353 A1* | 11/2017 | Banachowicz | H04N 5/369 |
| 2017/0347086 A1* | 11/2017 | Watanabe | H04N 5/332 |
| 2018/0021004 A1* | 1/2018 | Ishii | A61B 6/54 378/62 |
| 2018/0047208 A1* | 2/2018 | Marin | H04N 13/243 |
| 2018/0053284 A1* | 2/2018 | Rodriguez | G06T 3/4007 |
| 2018/0091704 A1* | 3/2018 | Koyama | H04N 5/93 |
| 2018/0092616 A1* | 4/2018 | Sakaguchi | G16H 50/30 |
| 2018/0108169 A1* | 4/2018 | Miller | G06T 15/08 |
| 2018/0109802 A1* | 4/2018 | Takeda | H04N 19/105 |
| 2018/0137366 A1* | 5/2018 | Szeto | G06T 7/74 |
| 2018/0152634 A1* | 5/2018 | Tang | H04N 5/23216 |
| 2018/0152664 A1* | 5/2018 | Urabe | H04N 7/183 |
| 2018/0159624 A1* | 6/2018 | Jang | H04B 10/116 |
| 2018/0176483 A1* | 6/2018 | Knorr | G06T 19/006 |
| 2018/0199039 A1* | 7/2018 | Trepte | G06T 7/70 |
| 2018/0239801 A1* | 8/2018 | Gudadhe | G06F 16/24561 |
| 2018/0249183 A1* | 8/2018 | Lindberg | H04N 19/48 |
| 2018/0263479 A1* | 9/2018 | Ito | A61B 1/00009 |
| 2018/0270462 A1* | 9/2018 | Otsubo | H01L 27/14645 |
| 2018/0278913 A1* | 9/2018 | Attar | H04N 9/43 |
| 2018/0286126 A1* | 10/2018 | Schwarz | G06F 3/04845 |
| 2018/0288356 A1* | 10/2018 | Ray | H04N 19/436 |
| 2018/0322611 A1* | 11/2018 | Bang | G06T 3/0062 |
| 2018/0343442 A1* | 11/2018 | Yoshikawa | G08B 13/19608 |
| 2018/0350044 A1* | 12/2018 | Ponto | G06T 15/04 |
| 2018/0352207 A1* | 12/2018 | Kern, II | H04N 13/161 |
| 2018/0357813 A1* | 12/2018 | Hong | G06T 19/20 |
| 2018/0368783 A1* | 12/2018 | Pohl | A61B 5/7425 |
| 2019/0005668 A1* | 1/2019 | Sugimura | G06K 9/6267 |
| 2019/0035149 A1* | 1/2019 | Chen | G06K 9/00255 |
| 2019/0051036 A1* | 2/2019 | Matsunobu | G06T 17/00 |
| 2019/0068929 A1* | 2/2019 | Sato | H04N 9/04553 |
| 2019/0068973 A1* | 2/2019 | Hamilton | H04N 19/172 |
| 2019/0089915 A1* | 3/2019 | Furukawa | H04N 19/124 |
| 2019/0089943 A1* | 3/2019 | Yun | H04N 13/117 |
| 2019/0098325 A1* | 3/2019 | Hsieh | H03M 7/3079 |
| 2019/0109994 A1* | 4/2019 | Kikuchi | H04N 9/04557 |
| 2019/0139296 A1* | 5/2019 | Lakshman | G06T 15/205 |
| 2019/0164332 A1* | 5/2019 | Matsunobu | G06T 15/08 |
| 2019/0166380 A1* | 5/2019 | Chen | H04N 19/176 |
| 2019/0188451 A1* | 6/2019 | D'Ercoli | G06V 10/457 |
| 2019/0191146 A1* | 6/2019 | Koyama | G06T 7/80 |
| 2019/0197735 A1* | 6/2019 | Xiong | H04N 13/246 |
| 2019/0213435 A1* | 7/2019 | Nikhara | G06T 7/50 |
| 2019/0228263 A1* | 7/2019 | Szeto | G06K 9/00671 |
| 2019/0251702 A1* | 8/2019 | Chandler | G06F 3/013 |
| 2019/0259169 A1* | 8/2019 | Higaki | G06T 5/50 |
| 2019/0281274 A1* | 9/2019 | Sugio | H04N 21/816 |
| 2019/0295263 A1* | 9/2019 | Kuroki | G06T 7/194 |
| 2019/0297230 A1* | 9/2019 | Kitagawa | G08B 13/19667 |
| 2019/0304139 A1* | 10/2019 | Joshi | G06T 9/001 |
| 2019/0304160 A1* | 10/2019 | Izumi | H04N 13/117 |
| 2019/0311526 A1* | 10/2019 | Sugio | H04N 13/117 |
| 2019/0313080 A1* | 10/2019 | Mitchell | H03M 13/6572 |
| 2019/0325613 A1* | 10/2019 | Wu | G06T 3/4007 |
| 2019/0333183 A1* | 10/2019 | Neela | G06K 9/6261 |
| 2019/0333249 A1* | 10/2019 | Wyman | G06T 1/60 |
| 2019/0333269 A1* | 10/2019 | Matsunobu | G06T 15/205 |
| 2019/0342537 A1* | 11/2019 | Taya | H04N 5/23219 |
| 2019/0342541 A1* | 11/2019 | Bai | H04N 13/254 |
| 2019/0362546 A1* | 11/2019 | Wayenberg | G06T 19/20 |
| 2019/0364265 A1* | 11/2019 | Matsunobu | H04N 13/194 |
| 2019/0377553 A1* | 12/2019 | Maynard | G06F 7/588 |
| 2019/0379917 A1* | 12/2019 | Sugio | H04N 21/2365 |
| 2019/0385357 A1* | 12/2019 | Chui | G06T 5/50 |
| 2019/0385358 A1* | 12/2019 | Chui | G06F 16/58 |
| 2019/0391869 A1* | 12/2019 | Gopal | G06F 11/1004 |
| 2020/0007845 A1* | 1/2020 | Fukuyasu | H04N 19/597 |
| 2020/0014953 A1* | 1/2020 | Mammou | H04N 19/463 |
| 2020/0021847 A1* | 1/2020 | Kim | H04N 19/17 |
| 2020/0029063 A1* | 1/2020 | Briggs | G06T 3/20 |
| 2020/0034674 A1* | 1/2020 | Hayashi | H03M 7/3088 |
| 2020/0034989 A1* | 1/2020 | Koyama | G06T 7/85 |
| 2020/0036978 A1* | 1/2020 | Kim | H04N 19/85 |
| 2020/0084463 A1* | 3/2020 | Abraham | H04N 19/136 |
| 2020/0137335 A1* | 4/2020 | Oh | H04L 9/10 |
| 2020/0177767 A1* | 6/2020 | Kelly | H04N 1/56 |
| 2020/0184710 A1* | 6/2020 | Besley | G06T 19/00 |
| 2020/0202495 A1* | 6/2020 | Wang | G06T 5/50 |
| 2020/0228836 A1* | 7/2020 | Schwarz | H04N 13/371 |
| 2020/0244993 A1* | 7/2020 | Schwarz | G06T 15/20 |
| 2020/0250798 A1* | 8/2020 | Lasang | G06T 5/006 |
| 2020/0273188 A1* | 8/2020 | Hamilton | H04N 13/161 |
| 2020/0280710 A1* | 9/2020 | Vosoughi | H04N 19/117 |
| 2020/0293885 A1* | 9/2020 | Yoshinaga | H03M 7/46 |
| 2020/0296310 A1* | 9/2020 | Hicks | H04N 19/98 |
| 2021/0099686 A1* | 4/2021 | Panchagnula | H04N 13/194 |
| 2021/0134058 A1* | 5/2021 | Ito | H04N 13/111 |
| 2021/0192750 A1* | 6/2021 | Veelaert | G06T 7/215 |
| 2021/0192796 A1* | 6/2021 | Aflaki Beni | G06T 9/40 |
| 2021/0203949 A1* | 7/2021 | Horishita | H04N 19/182 |
| 2021/0209738 A1* | 7/2021 | Ponto | G06T 17/005 |
| 2021/0217202 A1* | 7/2021 | Zakharchenko | H04N 19/597 |
| 2021/0218936 A1* | 7/2021 | Meitav | H04N 19/186 |
| 2021/0248758 A1* | 8/2021 | Li | G06T 7/248 |
| 2021/0281852 A1* | 9/2021 | Alshina | H04N 19/159 |
| 2021/0302590 A1* | 9/2021 | Minami | G01S 7/4816 |
| 2021/0312703 A1* | 10/2021 | Aoki | G06T 11/00 |
| 2021/0352323 A1* | 11/2021 | Sugio | G06T 9/001 |
| 2021/0368183 A1* | 11/2021 | Deshpande | H04N 19/31 |
| 2021/0377551 A1* | 12/2021 | Johnson | H04N 19/36 |
| 2021/0385454 A1* | 12/2021 | Fleureau | H04N 19/124 |

(56) References Cited

U.S. PATENT DOCUMENTS

| | | | |
|---|---|---|---|
| 2022/0084252 A1* | 3/2022 | Appu | G06T 1/20 |
| 2022/0230359 A1* | 7/2022 | Johnson | G06T 7/90 |
| 2022/0286142 A1* | 9/2022 | Fenney | G06T 1/60 |

FOREIGN PATENT DOCUMENTS

| | | |
|---|---|---|
| JP | 2009-212648 | 9/2009 |
| JP | 2012-191569 | 10/2012 |
| WO | 2014/076868 | 5/2014 |

OTHER PUBLICATIONS

Extended European Search Report dated Sep. 20, 2019 in corresponding European Patent Application No. 17888877.2.

Takanori Senoh et al., "FTV AHG: CfE Response fDEVS", ISO/IEC JTC1/SC29/WG11, MPEG Meeting, San Diego, Feb. 22-26, 2016, No. M37953, Feb. 2016.

International Search Report (ISR) dated Feb. 27, 2018 in International (PCT) Application No. PCT/JP2017/045912.

Shinya Shimizu, et al., "A Study on Multi-view Depth Map Coding for View Interpolation", Picture Coding Symposium of Japan (PCSJ2008), Proceedings of 23th Symposium, Oct. 2008, pp. 99-100 with partial English translation.

\* cited by examiner

THREE-DIMENSIONAL MODEL DISTRIBUTION METHOD, THREE-DIMENSIONAL MODEL RECEIVING METHOD, THREE-DIMENSIONAL MODEL DISTRIBUTION DEVICE, AND THREE-DIMENSIONAL MODEL RECEIVING DEVICE

CROSS REFERENCE TO RELATED APPLICATIONS

This application is a U.S. continuation application of PCT International Patent Application Number PCT/JP2017/045912 filed on Dec. 21, 2017, claiming the benefit of priority of U.S. Provisional Patent Application No. 62/439,646 filed on Dec. 28, 2016, the entire contents of which are hereby incorporated by reference.

BACKGROUND

1. Technical Field

The present disclosure relates to a three-dimensional model distribution method for distributing a three-dimensional model, a three-dimensional model receiving method, a three-dimensional model distribution device, and a three-dimensional model receiving device.

2. Description of the Related Art

Japanese Unexamined Patent Application Publication No. 9-237354 discloses a method of transferring three-dimensional data. In Japanese Unexamined Patent Application Publication No. 9-237354, three-dimensional data is transferred to a network for each element, for example, a polygon or a voxel. The three-dimensional data is captured by a receiving side and is expanded into an image displayed for each of the received elements.

SUMMARY

In a three-dimensional model distribution method for distributing a three-dimensional model, a three-dimensional model receiving method, a three-dimensional model distribution device, and a three-dimensional model receiving device, a reduction in the amount of distributed data has been demanded.

An object of the present disclosure is to provide a three-dimensional model distribution method, a three-dimensional model receiving method, a three-dimensional model distribution device, or a three-dimensional model receiving device, whereby the amount of distributed data can be reduced.

In order to achieve the aforementioned object, a three-dimensional model distribution method according to an aspect of the present disclosure includes: generating a depth image from a three-dimensional model; and distributing the depth image and information for restoring the three-dimensional model from the depth image.

A three-dimensional model receiving method according to an aspect of the present disclosure includes: receiving a depth image generated from a three-dimensional model, and information for restoring the three-dimensional model from the depth image; and restoring the three-dimensional model from the depth image by using the information.

Note that these generic and specific aspects may be implemented as a system, a method, an integrated circuit, a computer program, or may be implemented as a computer-readable recording medium such as a CD-ROM, or as any combination of a system, a method, an integrated circuit, a computer program, or a computer-readable recording medium.

The present disclosure can provide a three-dimensional model distribution method, a three-dimensional model receiving method, a three-dimensional model distribution device, or a three-dimensional model receiving device, whereby the amount of distributed data can be reduced.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
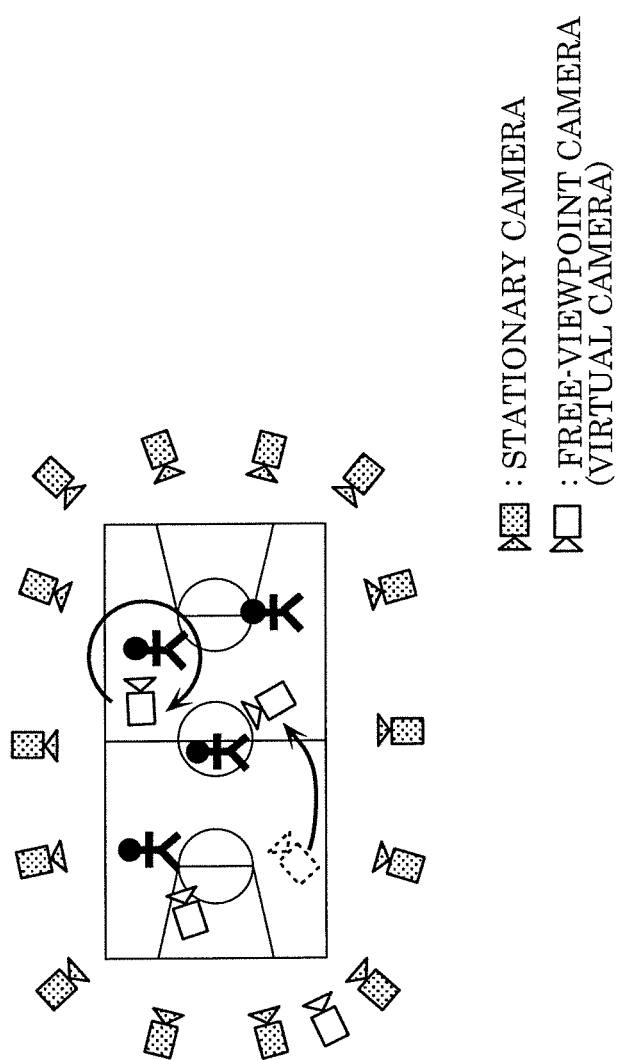
FIG. 1 is a block diagram illustrating the outline of a free-viewpoint video generating system according to Embodiment 1.

A three-dimensional model distribution method according to an aspect of the present disclosure includes: distributing a first model, which is a three-dimensional model of a target space in a target time period, in a first distribution mode; and distributing a second model, which is a three-dimensional model of the target space in the target time period and makes a smaller change per unit time than the first model, in a second distribution mode different from the first distribution mode.

Thus, the three-dimensional model distribution method can distribute the first model and the second model, which make different changes per unit time, in the appropriate distribution modes. Therefore, the three-dimensional model distribution method can achieve proper distribution in response to a request.

For example, the first distribution mode may have a shorter distribution period than a distribution period of the second distribution mode.

Hence, the three-dimensional model distribution method can distribute the first model and the second model, which make different changes per unit time, in the appropriate distribution modes.

For example, a first encoding method may be used in the first distribution mode, and a second encoding method having a larger processing delay than the first encoding method may be used in the second distribution mode.

Thus, the three-dimensional model distribution method can reduce the processing delay of the first model.

For example, a first encoding method may be used in the first distribution mode, and a second encoding method having different encoding efficiency from the first encoding method may be used in the second distribution mode.

Hence, the three-dimensional model distribution method can distribute the first model and the second model, which make different changes per unit time, using the appropriate encoding methods.

For example, the first distribution mode may have a lower delay than the second distribution mode.

Thus, the three-dimensional model distribution method can reduce the delay of the first model.

For example, the three-dimensional model distribution method may further include: generating the first model according to a first generating method; and generating the second model according to a second generating method having different accuracy from the first generating method.

Hence, the three-dimensional model distribution method can distribute the first model and the second model, which make different changes per unit time, according to the appropriate generating methods.

For example, in the generating of the first model, the first model may be generated as a difference between a third model and the second model, from the third model that is a three-dimensional model of a plurality of objects included in the target space in the target time period and the second model that is a three-dimensional model of some of the plurality of objects included in the target space in the target time period.

Thus, the three-dimensional model distribution method can easily generate the first model.

For example, in the generating of the first model: a third multi-viewpoint image may be generated as a difference between a first multi-viewpoint image of a plurality of objects included in the target space in the target time period and a second multi-viewpoint image of some of the plurality of objects; and the first model may be generated by using the third multi-viewpoint image.

For example, terminals at distribution destinations of the first model and the second model may generate free-viewpoint video from selected viewpoints by using the first model and the second model, and the three-dimensional model distribution method may preferentially distribute the first model necessary for generating the free-viewpoint video.

Thus, the three-dimensional model distribution method can efficiently distribute information necessary for generating free-viewpoint video.

A three-dimensional model distribution method according to an aspect of the present disclosure includes: generating a third model, as a difference between a first model and a second model, from the first model that is a three-dimensional model of a plurality of objects included in a target space in a target time period and the second model that is a three-dimensional model of some of the plurality of objects included in the target space in the target time period; distributing the second model in a first distribution mode; and distributing the third model in a second distribution mode different from the first distribution mode.

Thus, the three-dimensional model distribution method can distribute the second model and the third model in the appropriate distribution modes. Therefore, the three-dimensional model distribution method can achieve proper distribution in response to a request.

A three-dimensional model distribution device according to an aspect of the present disclosure includes: a first distributor that distributes a first model in a first distribution mode, the first model being a three-dimensional model of a target space in a target time period; and a second distributor that distributes a second model in a second distribution mode different from the first distribution mode, the second model being a three-dimensional model of the target space in the target time period and making a smaller change per unit time than the first model.

Thus, the three-dimensional model distribution device can distribute the first model and the second model, which make different changes per unit time, in the appropriate distribution modes. Therefore, the three-dimensional model distribution method can achieve proper distribution in response to a request.

A three-dimensional model distribution device according to an aspect of the present disclosure includes: a three-dimensional model generator that generates a third model, as a difference between a first model and a second model, from the first model that is a three-dimensional model of a plurality of objects included in a target space in a target time period and the second model that is a three-dimensional model of some of the plurality of objects included in the target space in the target time period; and a distributor that distributes the second model in a first distribution mode and distributes the third model in a second distribution mode different from the first distribution mode.

Thus, the three-dimensional model distribution device can distribute the second model and the third model in the appropriate distribution modes. Therefore, the three-dimensional model distribution method can achieve proper distribution in response to a request.

A three-dimensional model distribution method according to an aspect of the present disclosure includes: generating a depth image from a three-dimensional model; and distributing the depth image and information for restoring the three-dimensional model from the depth image.

Thus, the three-dimensional model is not distributed as it is but the depth image generated from the three-dimensional model is distributed. This can suppress the amount of distributed data.

For example, the three-dimensional model distribution method may further include: compressing the depth image according to a two-dimensional image compression scheme, wherein in the distributing, the depth image compressed may be distributed.

Thus, in the distribution of the three-dimensional model, data can be compressed according to a two-dimensional image compression scheme. This eliminates the need for constructing another compression scheme for three-dimensional models, thereby easily reducing the amount of data.

For example, in the generating of the depth image, a plurality of depth images from different viewpoints may be generated from the three-dimensional model, and in the compressing, the plurality of depth images may be compressed by using a relationship between the plurality of depth images.

This can further reduce the amount of data of the depth images.

For example, the three-dimensional model distribution method may further include: generating the three-dimensional model by using a plurality of images captured by a plurality of imaging devices; and distributing the plurality of images, wherein a viewpoint of the depth image may be a viewpoint of one of the plurality of images.

Thus, the viewpoint of the depth image is matched with the viewpoint of the captured image, thereby, for example, allowing calculating parallax information between the captured images by using the depth image and generating a predicted image between the viewpoints by using the parallax information if the captured images are compressed by multi-view encoding. This can reduce the encoding amount of the captured images.

For example, wherein in the generating of the depth image, the depth image may be generated by projecting the three-dimensional model to an imaging plane of a predetermined viewpoint, and the information may include a parameter for projecting the three-dimensional model to the imaging plane of the predetermined viewpoint.

For example, the three-dimensional model distribution method may further include: determining a bit length of each pixel included in the depth image; and distributing information on the bit length.

This can switch bit lengths according to the subject or the purpose of use, thereby properly reducing the amount of data.

For example, in the determining of the bit length, the bit length may be determined according to a distance to a subject.

For example, the three-dimensional model distribution method may further include: determining a relationship between pixel values expressed by the depth image and distances; and distributing information on the determined relationship.

This can change the relationship between a pixel value and a distance according to the subject or the purpose of use, thereby improving the accuracy of the restored three-dimensional model.

For example, the three-dimensional model may include a first model and a second model that makes a smaller change per unit time than the first model, the depth image may include a first depth image and a second depth image. In the generating of the depth image, the first depth image may be generated from the first model and the second depth image may be generated from the second model. In the determining of the relationship, a first relationship between pixel values expressed by the first depth image and distances and a second relationship between pixel values expressed by the second depth image and distances may be determined. In the first relationship, a distance resolution in a first distance range may be higher than a distance resolution in a second distance range that is more remote than the first distance range, and in the second relationship, a distance resolution in the first distance range may be lower than a distance resolution in the second distance range.

For example, color information may be added to the three-dimensional model, the three-dimensional model distribution method may further include: generating a texture image from the three-dimensional model; and compressing the texture image according to the two-dimensional image compression scheme, and in the distributing, the texture image compressed may be further distributed.

A three-dimensional model receiving method according to an aspect of the present disclosure includes: receiving a depth image generated from a three-dimensional model, and information for restoring the three-dimensional model from the depth image; and restoring the three-dimensional model from the depth image by using the information.

Thus, the three-dimensional model is not distributed as it is but the depth image generated from the three-dimensional model is distributed. This can suppress the amount of distributed data.

For example, the depth image may be compressed according to a two-dimensional image compression scheme, and the three-dimensional model receiving method may further include decoding the depth image compressed.

Thus, in the distribution of the three-dimensional model, data can be compressed according to a two-dimensional image compression scheme. This eliminates the need for constructing another compression scheme for three-dimensional models, thereby easily reducing the amount of data.

For example, in the receiving, a plurality of depth images may be received, and in the decoding, the plurality of depth images may be compressed by using a relationship between the plurality of depth images.

This can further reduce the amount of data of the depth images.

For example, the three-dimensional model receiving method may further include: generating a rendering image by using the three-dimensional model and a plurality of images, wherein a viewpoint of the depth image may be a viewpoint of one of the plurality of images.

Thus, the viewpoint of the depth image is matched with the viewpoint of the captured image, thereby, for example, allowing calculating parallax information between the captured images by using the depth image and generating a predicted image between the viewpoints by using the parallax information if the captured images are compressed by multi-view encoding. This can reduce the encoding amount of the captured images.

For example, the information may include a parameter for projecting the three-dimensional model to an imaging plane of the depth image, and in the restoring, the three-dimensional model may be restored from the depth image by using the parameter.

For example, the three-dimensional model receiving method may further include: receiving information on a bit length of each pixel included in the depth image.

This can switch bit lengths according to the subject or the purpose of use, thereby properly reducing the amount of data.

For example, the three-dimensional model receiving method may further include: receiving information on a relationship between pixel values expressed by the depth image and distances.

This can change the relationship between a pixel value and a distance according to the subject or the purpose of use, thereby improving the accuracy of the restored three-dimensional model.

For example, the three-dimensional model receiving method may further include: receiving a texture image compressed according to the two-dimensional image compression scheme; and decoding the texture image compressed, wherein in the restoring, the three-dimensional model with added color information may be restored by using the depth image decoded and the texture image decoded.

A three-dimensional model distribution device according to an aspect of the present disclosure includes: a depth image generator that generates a depth image from a three-dimensional model; and a distributor that distributes the depth image and information for restoring the three-dimensional model from the depth image.

Thus, the three-dimensional model is not distributed as it is but the depth image generated from the three-dimensional model is distributed. This can suppress the amount of distributed data.

A three-dimensional model receiving device according to an aspect of the present disclosure includes: a receiver that receives a depth image generated from a three-dimensional model, and information for restoring the three-dimensional model from the depth image; and a restorer that restores the three-dimensional model from the depth image by using the information.

Thus, the three-dimensional model is not distributed as it is but the depth image generated from the three-dimensional model is distributed. This can suppress the amount of distributed data.

Note that these generic or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The following describes embodiments with reference to the drawings. Note that the following embodiments show exemplary embodiments of the present disclosure. The numerical values, shapes, materials, structural components, the arrangement and connection of the structural components, steps, the processing order of the steps, etc. shown in the following embodiments are mere examples, and thus are not intended to limit the present disclosure. Of the structural components described in the following embodiments, structural components not recited in any one of the independent claims that indicate the broadest concepts will be described as optional structural components.

Embodiment 1

The outline of the present embodiment will be first described below. The present embodiment will describe a method of generating and distributing a three-dimensional model in a three-dimensional space recognizing system, e.g., a next-generation wide area monitoring system or a free-viewpoint video generating system.

FIG. 1 illustrates the outline of a free-viewpoint video generating system. For example, the same space is shot using calibrated cameras (e.g., stationary cameras) from multiple viewpoints, so that the shot space can be three-dimensionally reconstructed (three-dimensional space reconstruction). Tracking, scene analysis, and video rendering are performed using the three-dimensionally reconstructed data, thereby generating video from any viewpoint (free viewpoint camera). This can achieve a next-generation wide area monitoring system and a free viewpoint video generating system.

In such a system, a three-dimensional model generated by three-dimensional reconstruction is distributed via a network or the like and processing such as tracking, scene analysis, and video rendering is performed by a receiving terminal. However, the three-dimensional model has quite a large amount of data and thus may cause an insufficient network band, so that it takes a long time to receive the model.

In the present embodiment, a foreground model and a background model that constitute a three-dimensional model are separately distributed in different distribution modes. For example, a network band can be suppressed during distribution by suppressing the number of times of distribution of background models that are updated only a few times. This can shorten the reception time of a terminal.

Figure 2:
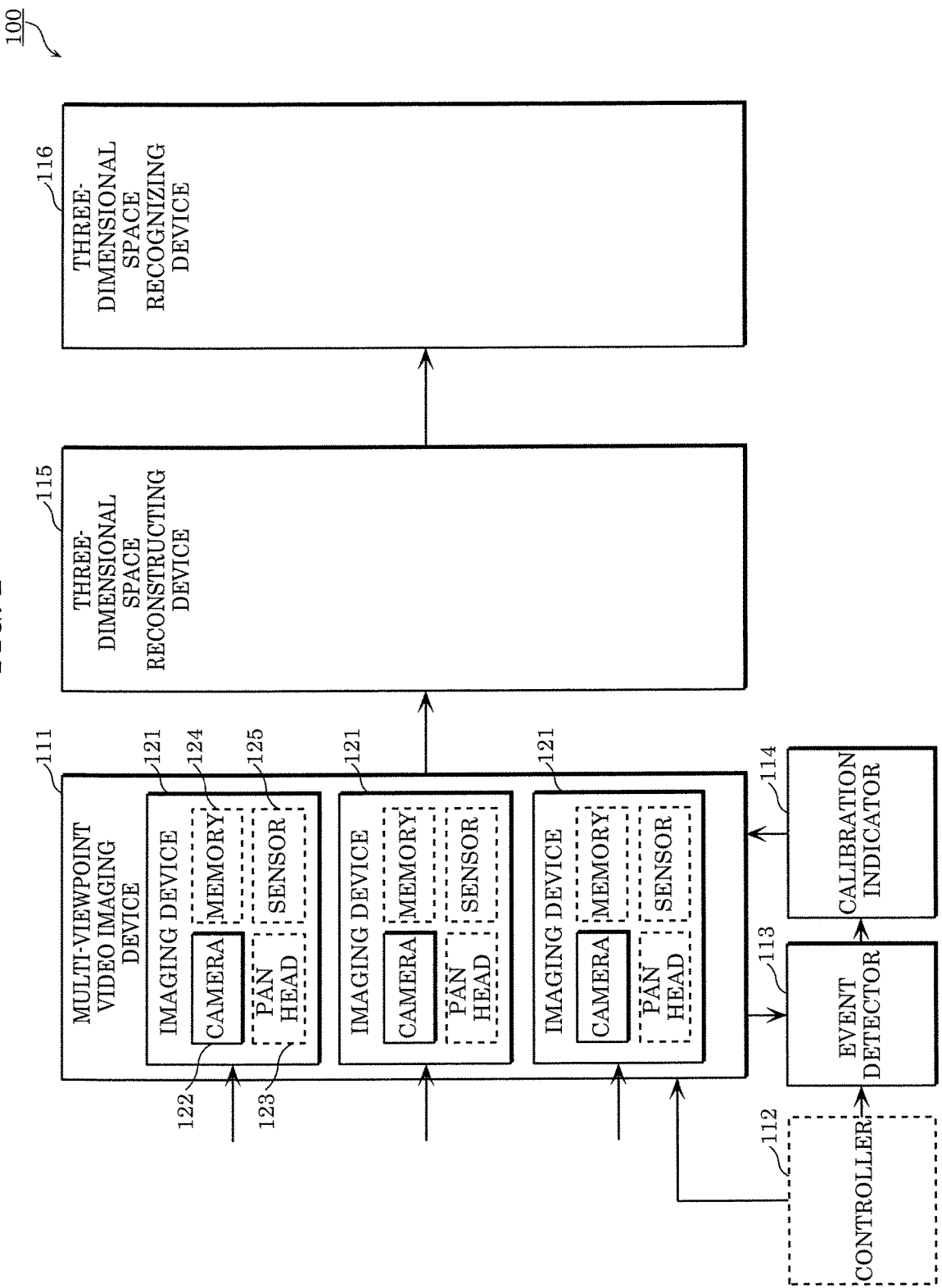
FIG. 2 is a block diagram illustrating the configuration of a three-dimensional space recognizing system according to Embodiment 1.

The configuration of three-dimensional space recognizing system 100 according to the present embodiment will be described below. FIG. 2 is a block diagram illustrating the configuration of three-dimensional space recognizing system 100. Three-dimensional space recognizing system 100 includes multi-viewpoint video imaging device 111, controller 112, event detector 113, calibration indicator 114, three-dimensional space reconstructing device 115, and three-dimensional space recognizing device 116.

Figure 3:
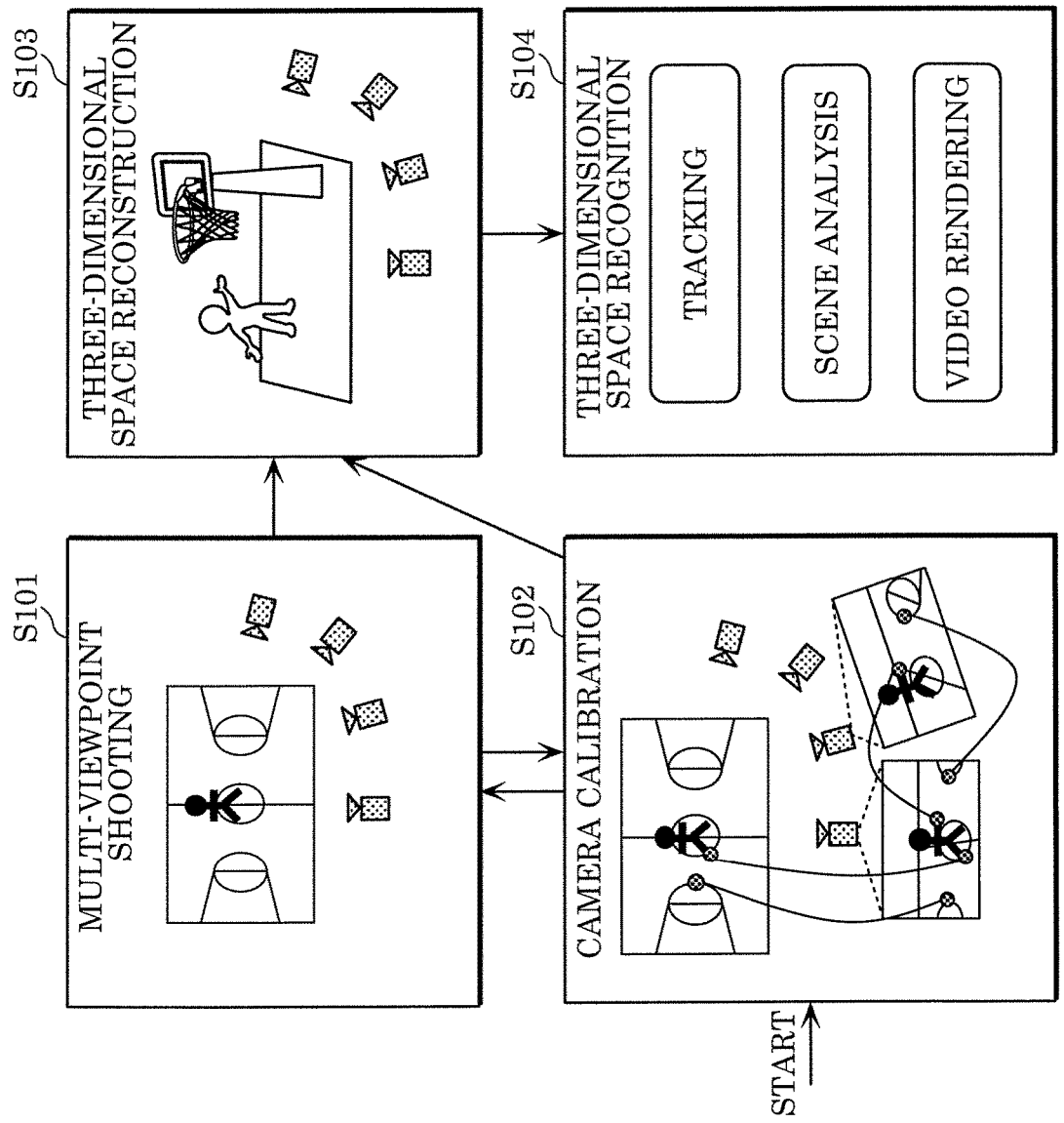
FIG. 3 illustrates the outline of the operations of the three-dimensional space recognizing system according to Embodiment 1.

FIG. 3 illustrates the outline of the operations of three-dimensional space recognizing system 100.

Multi-viewpoint video imaging device 111 generates multi-viewpoint video by shooting the same space (S101).

Correspondence between a point in a shooting environment and a point on video and point correspondence between videos are manually or automatically detected, enabling camera calibration in which the orientation of each camera (camera parameter) is estimated (S102).

Three-dimensional space reconstructing device 115 generates a three-dimensional model by performing three-dimensional space reconstruction in which a shooting space is three-dimensionally reconstructed using multi-viewpoint video and camera parameters (S103). For example, a foreground model and a background model are generated as three-dimensional models.

Finally, three-dimensional space recognizing device 116 performs three-dimensional space recognition by using the three-dimensional models (S104). Specifically, three-dimensional space recognizing device 116 performs tracking, scene analysis, and video rendering by using the three-dimensional models.

Figure 4:
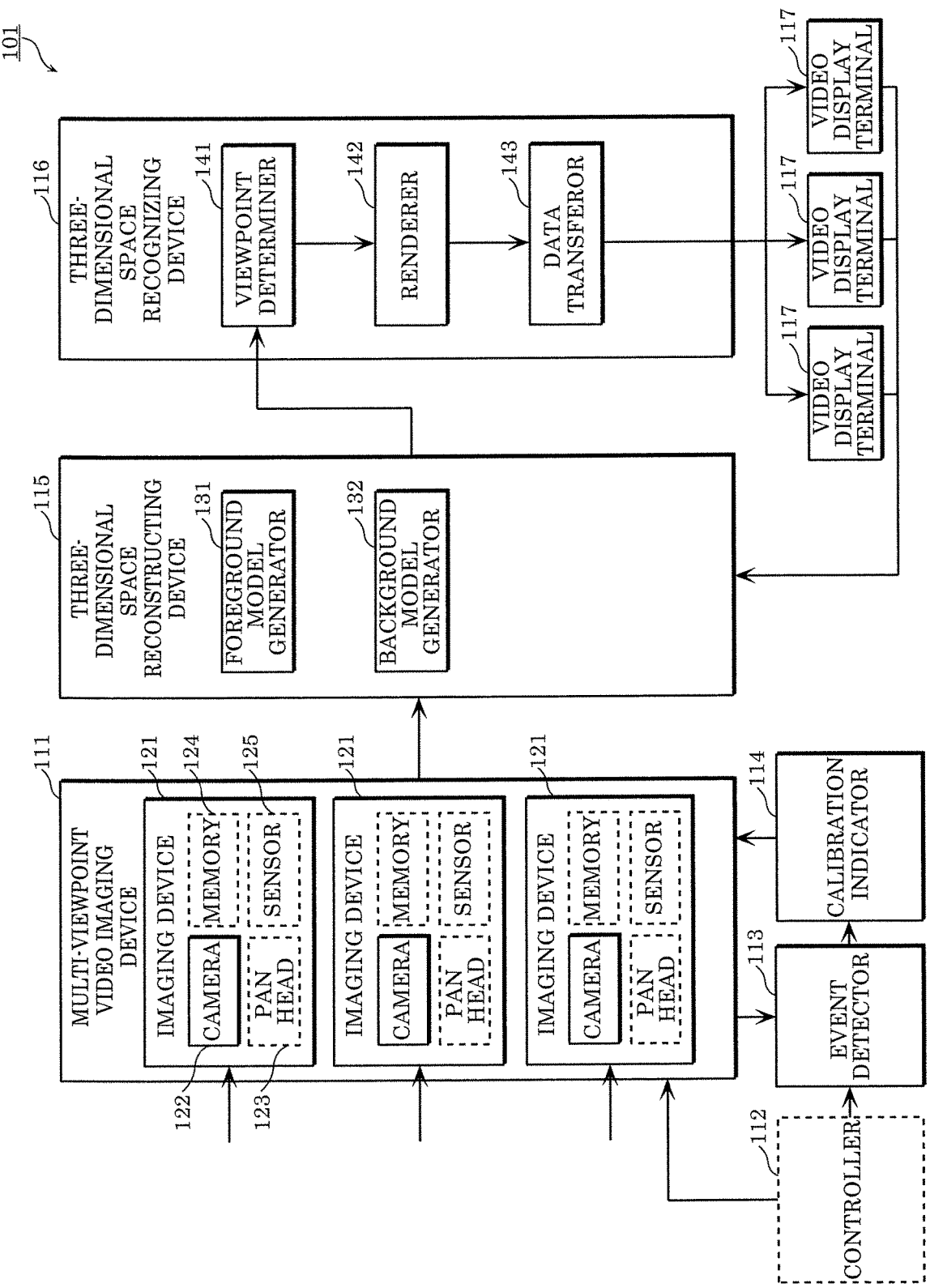
FIG. 4 is a block diagram illustrating the configuration of the free-viewpoint video generating system according to Embodiment 1.

Free-viewpoint video generating system 101 including three-dimensional space recognizing system 100 will be described below. FIG. 4 is a block diagram illustrating free-viewpoint video generating system 101 according to the present embodiment. Free-viewpoint video generating system 101 includes a plurality of video display terminals 117 as user terminals in addition to the configuration of three-dimensional space recognizing system 100. Moreover, three-dimensional space reconstructing device 115 includes foreground model generator 131 and background model generator 132. Three-dimensional space recognizing device 116 includes viewpoint determiner 141, renderer 142, and data transferor 143.

Figure 5:
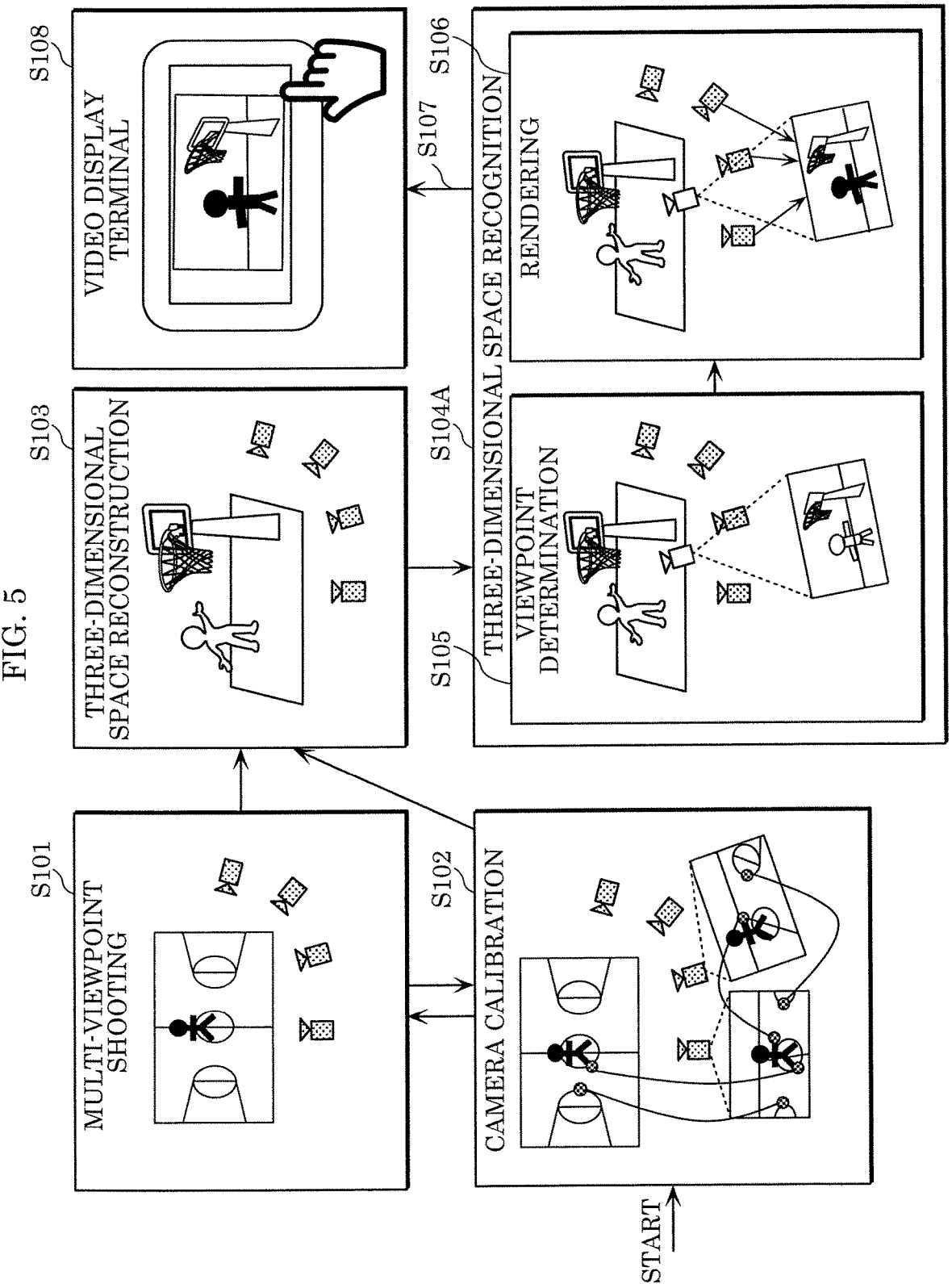
FIG. 5 illustrates the outline of the operations of the free-viewpoint video generating system according to Embodiment 1.
Figure 6:
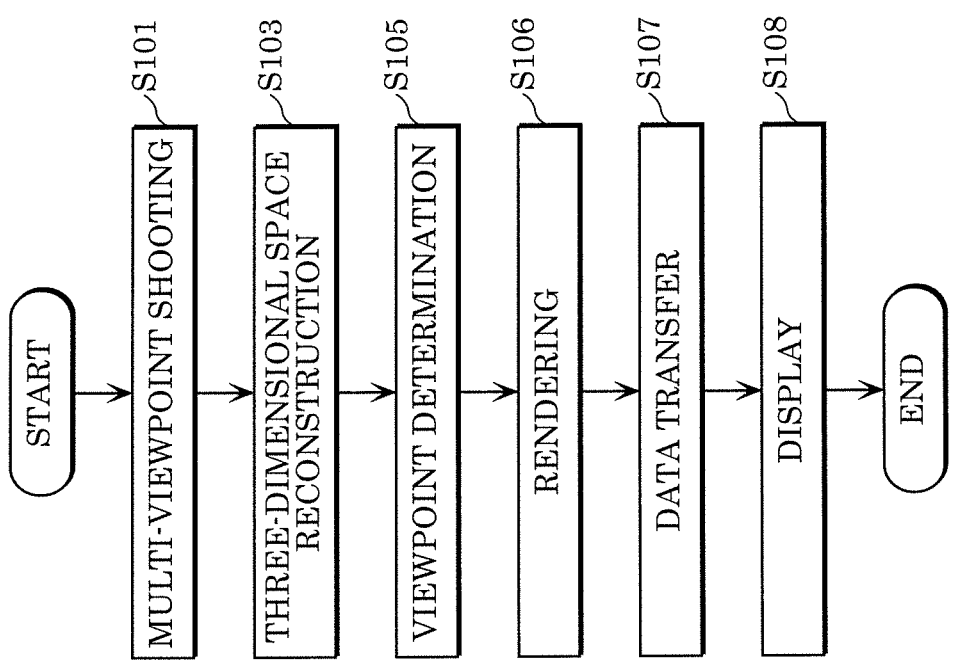
FIG. 6 is a flowchart showing the operations of the free-viewpoint video generating system according to Embodiment 1.

FIG. 5 shows the outline of the operations of free-viewpoint video generating system 101. FIG. 6 is a flowchart showing the operations of free-viewpoint video generating system 101.

First, multi-viewpoint video imaging device 111 generates multi-viewpoint video by performing multi-viewpoint shooting (S101). Multi-viewpoint video imaging device 111 includes multiple imaging devices 121. Imaging device 121 includes camera 122, pan head 123, memory 124, and sensor 125.

In response to a shooting start or a stop signal from controller 112, multi-viewpoint video imaging device 111 starts or stops shooting synchronized among imaging devices 121 according to the signal.

Imaging device 121 records a time stamp at the time of shooting while shooting video by means of camera 122. Moreover, imaging device 121 senses the shooting environment by using sensor 125 (a vibration sensor, an acceleration sensor, a magnetic field sensor, or a microphone) during the shooting and outputs the video, the time stamp, and sensing data to event detector 113.

When receiving calibration indication information from calibration indicator 114, multi-viewpoint video imaging device 111 adjusts imaging device 121 according to the calibration indication information, calibrates camera 122, and outputs a camera parameter obtained by the calibration to event detector 113.

Memory 124 in imaging device 121 temporarily stores video, time stamps, sensing data, and camera parameters or stores shooting settings (including a frame rate and a resolution).

Furthermore, camera calibration is performed at any time (S102). Specifically, event detector 113 detects a calibration event from at least one of video, a time stamp, and sensing information that are obtained from multi-viewpoint video imaging device 111, a three-dimensional model obtained from three-dimensional space reconstructing device 115, free-viewpoint video obtained from renderer 142, terminal information obtained from video display terminal 117, and control information obtained from controller 112, and then event detector 113 outputs calibration event information including the calibration event to calibration indicator 114. The calibration event information includes information indicating the calibration event, the significance of the calibration event, and imaging device 121 to be calibrated.

The calibration event acts as a trigger for calibrating imaging device 121. For example, when a displacement of camera 122 is detected, event detector 113 reaches a predetermined time, the accuracy of camera calibration increases, the accuracy of a model or free-viewpoint video decreases, free-viewpoint video is unnecessary, video from one imaging device 121 is unusable for generating free-viewpoint video, or a system administrator or a user provides an instruction, event detector 113 outputs the calibration event information.

Specifically, event detector 113 detects a displacement of camera 122 when the sensing information exceeds a threshold value, a background region in video is changed by the threshold value or more, or cheers rise. The predetermined time means a time when play is suspended, e.g., in a half time or at the bottom of the fifth inning, a time after the lapse of a certain time from the previous calibration, or the starting time of the system. The time when the accuracy of camera calibration increases means, for example, the time of extraction of at least a certain number of feature points from video. Moreover, event detector 113 determines the deterioration of accuracy in a model or free-viewpoint video according to, for example, the distortion of a wall or a ground in the model or free-viewpoint video.

The time when free-viewpoint video is unnecessary means a time when video display terminals 117 are all unused or when a scene recognized from sound or video is found to be negligible. The time when video from one imaging device 121 is unusable for generating free-viewpoint video means, for example, a time when a sufficient communication band is not obtained and the resolution or frame rate of video decreases, when synchronization is lost, or when an area shot by imaging device 121 does not receive attention because no athlete is shown.

The significance of the calibration event is calculated according to the calibration event or data observed when the calibration event is detected. For example, a displacement of the camera is more significant than other events. Moreover, for example, the larger the displacement of the camera, the higher the level of significance.

Moreover, event detector 113 may transmit the calibration event information to video display terminal 117 and notify a user of imaging device 121 being calibrated.

When receiving the calibration event information from event detector 113, calibration indicator 114 generates calibration indication information based on the calibration event information and outputs the generated calibration indication information to multi-viewpoint video imaging device 111.

The calibration indication information includes cameras 122 to be calibrated, the order of cameras 122 to be calibrated, control information on pan head 123, zoom magnification change information on camera 122, and a calibration method. The control information on pan head 123 indicates, for example, the amount of rotation of pan head 123 for returning camera orientation displaced by vibrations or the like to original orientation. The zoom magnification change information on the camera indicates, for example, a zoom-out amount required for covering the shooting area of camera 122 displaced by vibrations or the like.

The calibration method is a method of associating the three-dimensional coordinates of a specific point, line, or plane with two-dimensional coordinates on video or a method of associating two-dimensional coordinates on a specific point, line, or plane between at least two videos. The coordinates are associated with each other by at least one of a manual operation and an automatic operation. The accuracy of camera calibration may be improved by using a distance between at least two known points, lines, or planes or at least one stereo camera.

Subsequently, three-dimensional space reconstructing device 115 performs three-dimensional space reconstruction by using multi-viewpoint video (S103). Specifically, event detector 113 detects a model generation event from at least one of video, a time stamp, and sensing information that are obtained from multi-viewpoint video imaging device 111, terminal information obtained from video display terminal 117, and control information obtained from the controller, and then event detector 113 outputs model generation information including the model generation event to three-dimensional space reconstructing device 115.

The model generation information includes a model generation event and imaging device information. The imaging device information includes video, a background image, a camera parameter, the reliability of the camera parameter, and the calibration state of the camera. The model generation event is a trigger for generating the three-dimensional model of a shooting environment. Specifically, event detector 113 outputs the model generation information during the calibration of at least a certain number of cameras, at a predetermined time, or when free-viewpoint video is necessary.

The predetermined time is, for example, the time of a play or a time after the lapse of a certain time from previous model generation. A time when free-viewpoint video is necessary is, for example, when video display terminal 117 is used, when a scene recognized from sound or video is found to be significant, or when an instruction is provided from a system administrator or a viewing request is made from a user. The reliability of the camera parameter is determined by the result of camera calibration, the time of camera calibration, video, or sensing information. For example, the lower the reprojection error during camera calibration, the higher the reliability. The camera calibrated immediately before has higher reliability. The larger the number of feature points, the higher the reliability of the calibrated camera.

Three-dimensional space reconstructing device 115 generates the three-dimensional model of the shooting environment by using the model generation information obtained from event detector 113, and stores the generated three-dimensional model. According to the calibration state of the camera and the reliability of the camera parameter, three-dimensional space reconstructing device 115 during the model generation preferentially uses video shot by the calibrated reliable camera. Moreover, three-dimensional space reconstructing device 115 outputs model generation completion information to event detector 113 when the generation of the three-dimensional model of the shooting environment is completed.

When three-dimensional space recognizing device 116 acting as a free-viewpoint video generating device generates free-viewpoint video, three-dimensional space reconstructing device 115 outputs the three-dimensional model of the shooting environment to renderer 142.

Foreground model generator 131 generates a foreground model that is a model of a foreground making a motion change (large change) at each time. The foreground is, for example, a person or a ball. Background model generator 132 generates a background model that is a model of a background making no motion change (small change) at each time. The background is, for example, a venue or a goal. Hereinafter, a three-dimensional model means a model including a foreground model and a background model.

Foreground model generator 131 generates a foreground model according to a frame rate recorded by imaging device 121. For example, if the recorded frame rate is 30 frames per second, foreground model generator 131 generates a foreground model every 1/30 seconds.

Background model generator 132 generates a background model by using a background image not including a foreground, for example, a person or a ball that makes a motion change at each time. Background model generator 132 may reuse the generated background model in a certain period of time. Alternatively, background model generator 132 may generate another background model after a certain period of time and update the background model. This can reduce a throughput for generating a background model making only a few motions, thereby reducing a CPU usage and the amount of memory.

Figure 7:
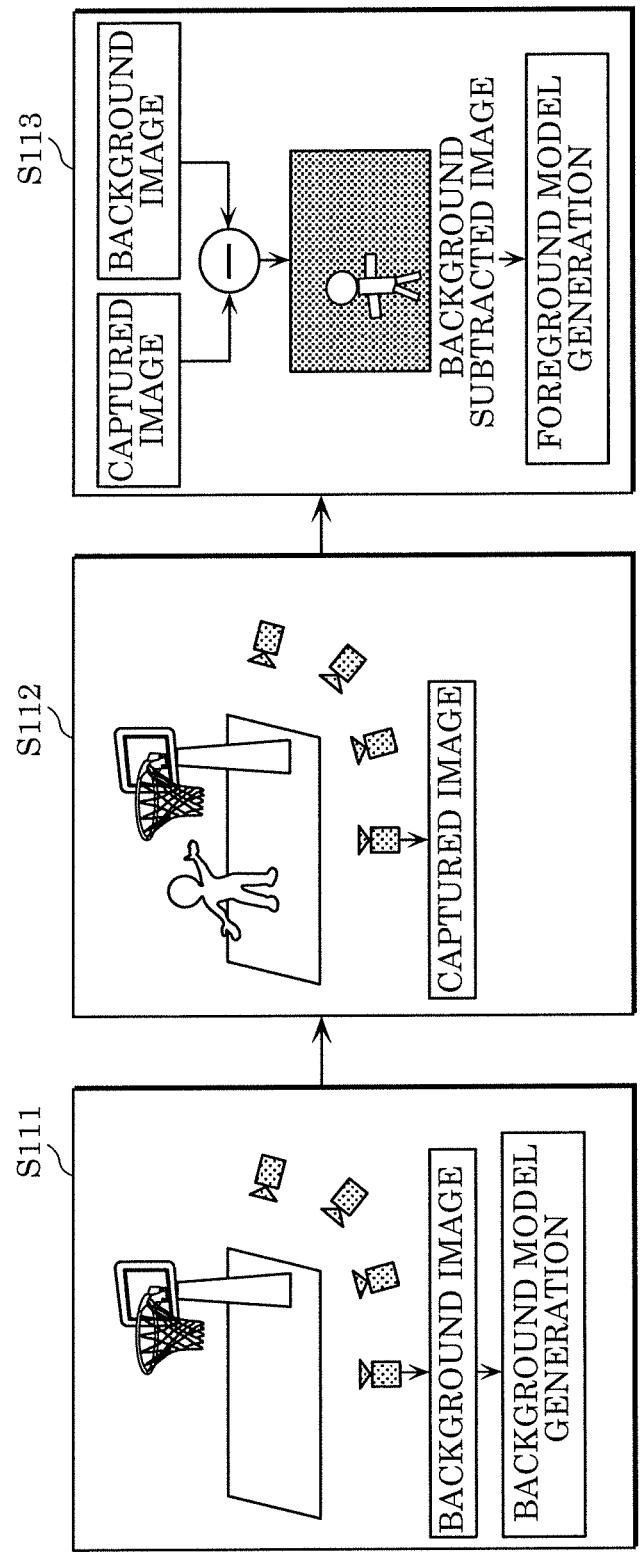
FIG. 7 illustrates a method of generating a foreground model according to Embodiment 1.

A method of generating the background model and the foreground model will be discussed below. FIG. 7 is an explanatory drawing of the processing.

First, background model generator 132 generates the background model (S111). For example, imaging devices 121 included in multi-viewpoint video imaging device 111 generate background images by shooting a background and then record the background images. Background model generator 132 generates the background model by using the background images. As a method of generating the background model, for example, the three-dimensional position of an object included in the background can be specified by calculating, from two or more stereo camera pairs, the depth of each pixel of the object included in a background image as in a multi-view stereo system. Alternatively, background model generator 132 may extract the feature of the background image and specify the three-dimensional position of the feature of the background image from the matching results of features between the cameras based on the principle of triangulation. Any method may be used as long as the three-dimensional model of an object included in a background is calculated.

The background model may be partially or entirely generated by a manual operation. For example, for an object such as a goal having a predetermined shape, a three-dimensional model may be generated in advance by CG or the like. In other words, background model generator 132 may obtain a predetermined background model.

Moreover, background model generator 132 may generate a background image by using captured images including foregrounds and backgrounds. For example, background model generator 132 may calculate the background image by using the mean value image of the captured images. Thus, even if a background image not including a foreground cannot be captured in advance, a background image can be generated, enabling the generation of a background model.

Subsequently, imaging devices 121 included in multi-viewpoint video imaging device 111 generate captured images by shooting a person (foreground) and a background and record the captured images (S112).

After that, foreground model generator 131 generates a foreground model (S113). Specifically, foreground model generator 131 generates a background subtracted image by subtracting a background image from an image captured from the same viewpoint by the same imaging device 121. Foreground model generator 131 generates the foreground model by using the background subtracted images of multiple viewpoints. The foreground model can be generated by a method of specifying the three-dimensional model of a foreground object in a space by using multiple background subtracted images as in a visual hull method. Alternatively, foreground model generator 131 may extract the feature of the foreground image (background subtracted image) and specify the three-dimensional position of the feature of the foreground image from the matching results of features between the cameras based on the principle of triangulation. Any method may be used as long as the three-dimensional model of an object included in a foreground is calculated.

In this way, the foreground model and the background model are generated.

After that, three-dimensional space recognition is performed using the three-dimensional model (S104A). First, viewpoint determiner 141 determines a virtual viewpoint (S105).

Specifically, event detector 113 detects model generation completion information obtained from three-dimensional space reconstructing device 115, terminal information obtained from video display terminal 117, and a free-viewpoint generation event from control information obtained from controller 112, and then event detector 113 outputs free-viewpoint information including the free-viewpoint generation event to viewpoint determiner 141.

The free-viewpoint generation information includes a free-viewpoint generation event, a request viewpoint, and imaging device information. The request viewpoint is, for example, a user-requested viewpoint that is obtained from video display terminal 117 or a viewpoint that is obtained from the controller and is specified by a system administrator. The viewpoint may be a point or a line on a three-dimensional space. The free-viewpoint generation event is a trigger for generating the free-viewpoint video of a shooting environment. Specifically, event detector 113 outputs the free-viewpoint information when the three-dimensional model of the shooting environment is generated, a user requests viewing or distribution of free-viewpoint video at a time when the generated three-dimensional model is present, or a system administrator provides an instruction for the viewing or distribution of the free-viewpoint video.

Viewpoint determiner 141 determines a viewpoint for the generation of free-viewpoint video based on the free-viewpoint information obtained from event detector 113, and then outputs the viewpoint as viewpoint information to renderer 142 along with the free-viewpoint information. Viewpoint determiner 141 determines the viewpoint based on a requested viewpoint. When any viewpoint is not requested, viewpoint determiner 141 may automatically detect a viewpoint from video so as to provide a front view of an athlete or automatically detect a viewpoint near calibrated reliable imaging device 121 according to the reliability of the camera parameter or the calibration state of the camera.

When the virtual viewpoint is set, the structure of a shooting environment viewed from the virtual viewpoint and distance information are determined based on the three-dimensional model (including the foreground model and the background model). Renderer 142 performs rendering using the three-dimensional model, thereby generating free-viewpoint video that is video viewed from the virtual viewpoint (S106).

Specifically, renderer 142 generates viewpoint video according to the viewpoint information and the free-viewpoint information that are obtained from viewpoint determiner 141 and the three-dimensional model of the shooting environment, the three-dimensional model being obtained from three-dimensional space reconstructing device 115. Renderer 142 then outputs the generated video as free-viewpoint video to data transferor 143.

In other words, renderer 142 generates the free-viewpoint video by projecting the three-dimensional model at a virtual viewpoint position indicated by the viewpoint information. At this point, renderer 142 preferentially acquires, for example, video color and texture information from, for example, video obtained by imaging device 121 close to the virtual viewpoint position. However, if imaging device 121 close to the virtual viewpoint position is being calibrated or the camera parameter has low reliability, renderer 142 may preferentially acquire color information from the video of imaging device 121 other than imaging device 121 close to the virtual viewpoint position. Moreover, if imaging device 121 close to the virtual viewpoint position is being calibrated or the camera parameter has low reliability, renderer 142 may reduce the noticeability of deteriorated image quality to a user by blurring video or increasing a reproduction speed. In this way, it is not always necessary that renderer 142 preferentially acquires the video of imaging device 121 close to the virtual viewpoint position. Colors and textures on video may be acquired by any method. Alternatively, color information may be added to the three-dimensional model in advance.

Subsequently, data transferor 143 distributes the free-viewpoint video obtained from renderer 142 to video display terminal 117 (S107). Data transferor 143 may distribute different free-viewpoint videos to respective video display terminals 117 based on a viewpoint requested by each user or may distribute, to video display terminals 117, the same free-viewpoint video generated based on a viewpoint specified by a system administrator or a viewpoint automatically determined by viewpoint determiner 141. Furthermore, data transferor 143 may compress the free-viewpoint video and distribute the compressed free-viewpoint video.

After that, video display terminal 117 displays the distributed free-viewpoint video (S108). In this configuration, video display terminal 117 includes a display, a radio, and a user input interface. The user transmits, to event detector 113 through video display terminal 117, a viewing request for viewing any region from any viewpoint at any time in a shooting environment. Video display terminal 117 receives the free-viewpoint video based on the viewing request from data transferor 143 and shows the free-viewpoint video to the user.

Moreover, video display terminal 117 receives the calibration event information obtained from event detector 113 and highlights the camera being calibrated on the display. This can notify the user that free-viewpoint video cannot be generated from a viewpoint near the imaging device or image quality may deteriorate.

The system administrator transmits a shooting start or stop signal from controller 112 to multi-viewpoint video imaging device 111 and causes multi-viewpoint video imaging device 111 to start or stop synchronous shooting.

If it is determined that camera calibration is necessary, the system administrator transmits the control information from controller 112 to event detector 113, enabling calibration of any camera.

If it is determined that the three-dimensional model of the shooting environment is necessary, the system administrator transmits the control information from controller 112 to event detector 113, enabling the generation of the three-dimensional model of the shooting environment at any time by means of any imaging device 121.

If it is determined that free-viewpoint video is necessary, the system administrator transmits the control information from controller 112 to event detector 113, so that free-viewpoint video at any time can be generated and distributed to video display terminal 117.

Embodiment 2

The function of generating free-viewpoint video may be used by a monitoring system. In this case, the estimated appearance of a suspect is viewed from a viewpoint having not been captured by an actual camera and can be shown to a security guard.

Figure 8:
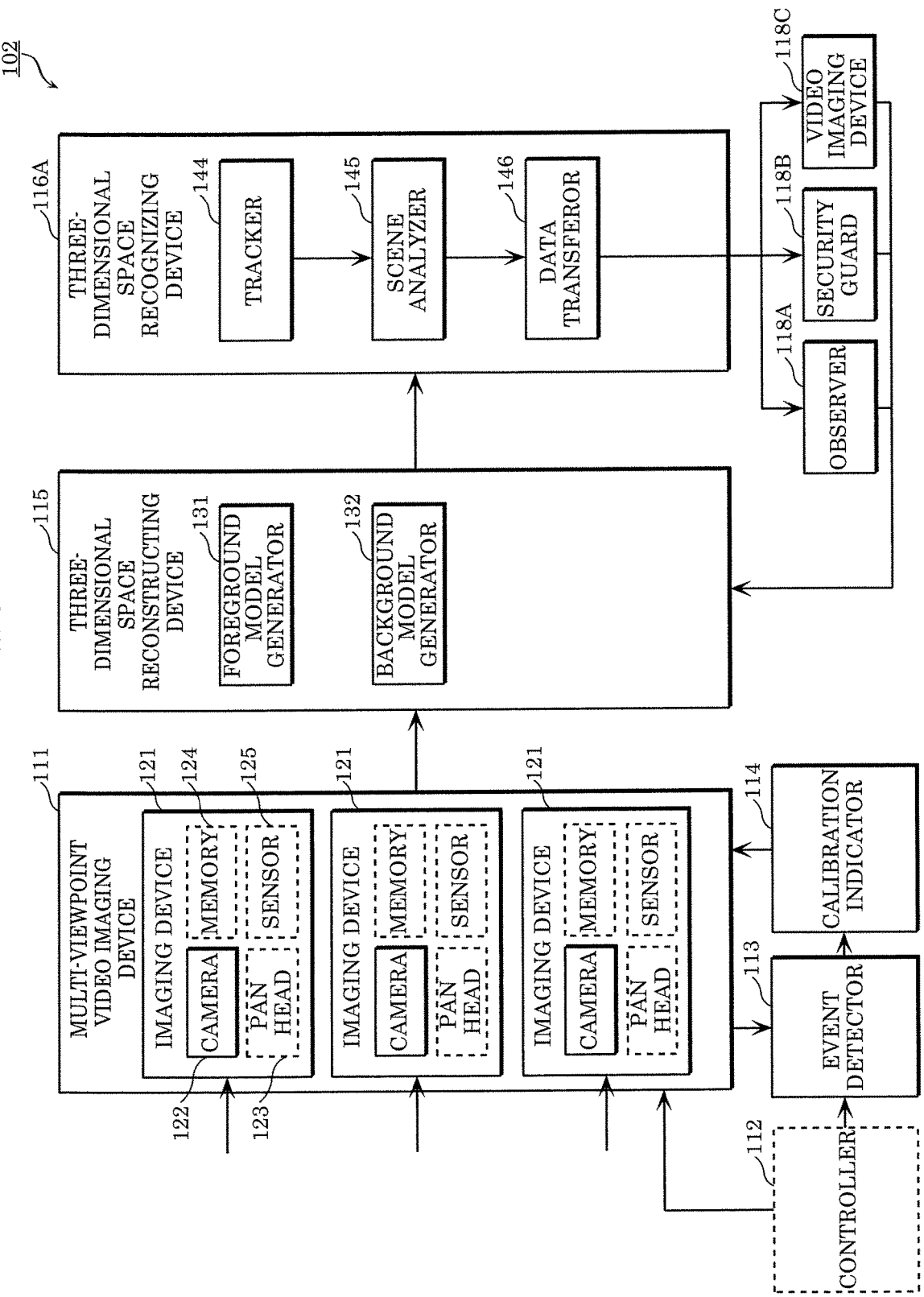
FIG. 8 is a block diagram illustrating the configuration of a next-generation monitoring system according to Embodiment 2.

FIG. 8 is a block diagram illustrating the configuration of next-generation monitoring system 102 according to the present embodiment. The configuration of three-dimensional space recognizing device 116A in next-generation monitoring system 102 in FIG. 8 is different from that of three-dimensional space recognizing device 116 in free-viewpoint video generating system 101 in FIG. 4. Moreover, next-generation monitoring system 102 includes observer 118A, security guard 118B, and video imaging device 118C instead of video display terminals 117.

Three-dimensional space recognizing device 116A includes tracker 144, scene analyzer 145, and data transferor 146.

Figure 9:
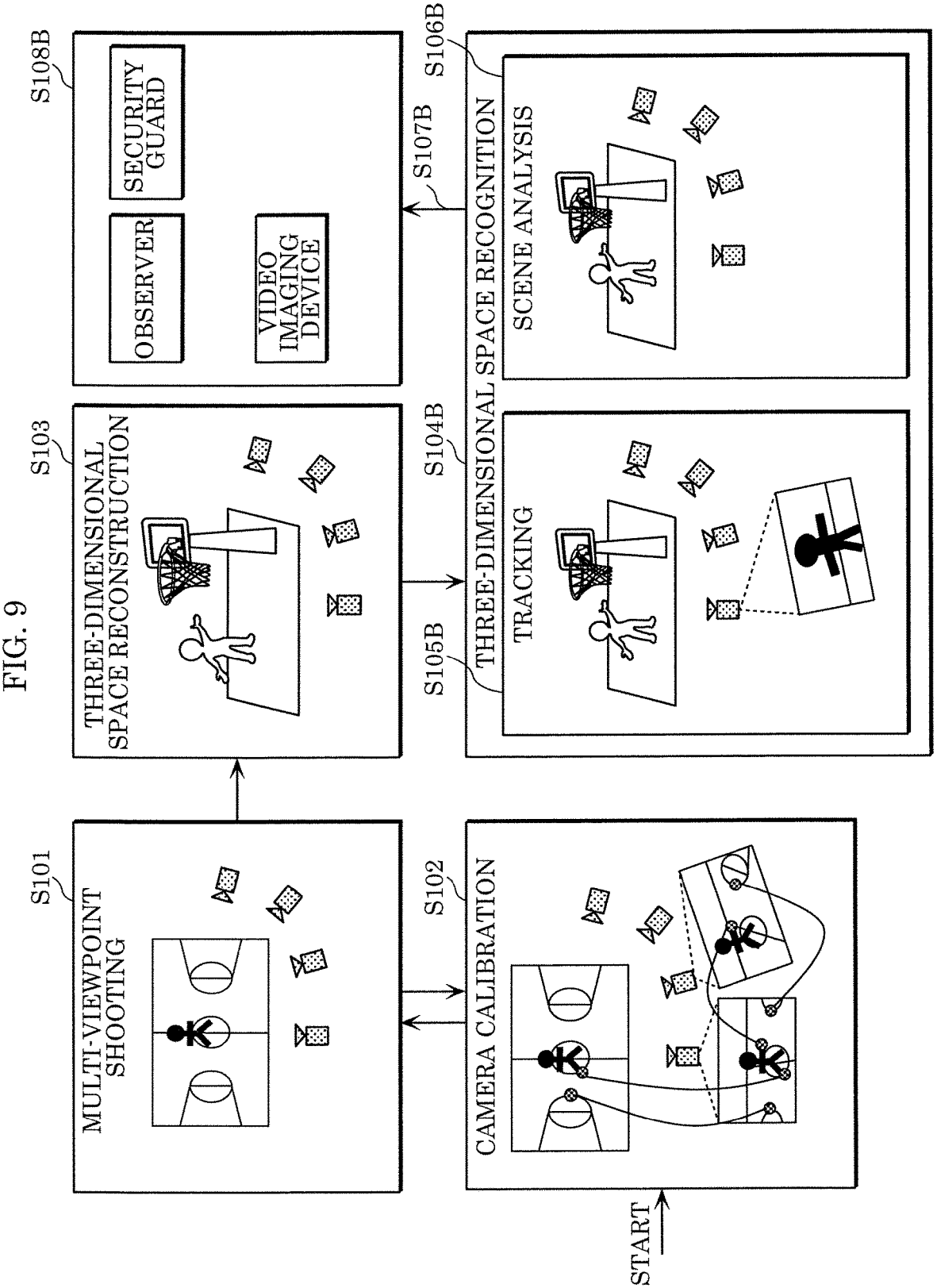
FIG. 9 illustrates the outline of the operations of the next-generation monitoring system according to Embodiment 2.
Figure 10:
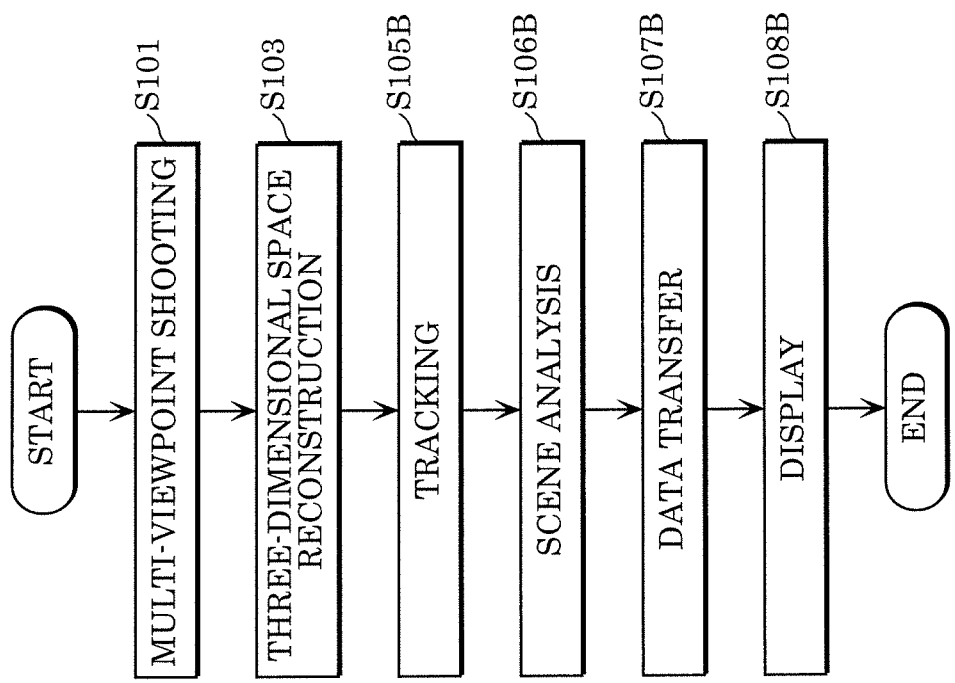
FIG. 10 is a flowchart showing the operations of the next-generation monitoring system according to Embodiment 2.

FIG. 9 illustrates the outline of the operations of next-generation monitoring system 102. FIG. 10 is a flowchart showing the operations of next-generation monitoring system 102. Multi-viewpoint shooting (S101), camera calibration (S102), and three-dimensional space reconstruction (S103) are similar to those of FIGS. 5 and 6.

Subsequently, three-dimensional space recognizing device 116A performs three-dimensional space recognition by using three-dimensional models (S104B). Specifically, tracker 144 tracks a person on a three-dimensional space (S105B). Furthermore, tracker 144 automatically extracts video including the person.

Scene analyzer 145 analyzes a scene (S106B). Specifically, scene analyzer 145 recognizes the state of the person or the scene and detects an abnormality from the three-dimensional space or multi-viewpoint video.

Data transferor 146 then transfers the result of three-dimensional space recognition to the terminals of observer 118A or security guard 118B or video imaging device 118C (S107B). Moreover, the result of three-dimensional space recognition is displayed on the terminal of observer 118A or security guard 118B or the display of video imaging device 118C (S108B).

The detail of the operations will be discussed below. As in the generation of free-viewpoint video, scene analyzer 145 and tracker 144 calculate the structure of each subject viewed from a virtual viewpoint in a shooting area and a distance from the virtual viewpoint based on a three-dimensional model generated by three-dimensional space reconstructing device 115. Furthermore, scene analyzer 145 and tracker 144 can preferentially acquire the color and texture of each subject from the video of imaging device 121 close to the virtual viewpoint and use the acquired information.

In scene analysis using two-dimensional video, video showing a state of each subject, e.g., a person or an object in a shooting area at a moment is analyzed by software or visual observation on a screen. The scene analysis is performed by scene analyzer 145 based on three-dimensional model data, enabling the observation of the three-dimensional posture of a person or the three-dimensional shape of an object in a shooting area. Thus, a state can be recognized and predicted with higher accuracy than in the use of two-dimensional video.

In tracking using two-dimensional video, for example, a subject in a shooting area is first identified by scene analysis on video captured by imaging device 121. Moreover, the same subject identified on video captured at a different moment by imaging device 121 is matched by software or a manual operation. Tracking is performed by the identification and matching of the subject along a time axis. However, in two-dimensional video or the like shot by imaging device 121, a target subject may be temporarily hidden behind another subject and may not be continuously identified. Also in this case, the subject can be continuously identified using three-dimensional position information or three-dimensional shape information on the subject according to the three-dimensional model.

The function of scene analysis and tracking using the three-dimensional model is employed by next-generation monitoring system 102. This can achieve early detection of a suspicious site and more accurate detection. Even if the number of installed cameras is limited at a site, a higher security level can be obtained than in the use of two-dimensional video.

Scene analyzer 145 analyzes data on a three-dimensional model and identifies, for example, a subject. The analysis result may be transferred to tracker 144 or displayed with free-viewpoint video on the display of a terminal or the like. Data on the analysis result of the free-viewpoint video may be stored in a storage device provided in a terminal or the like or in an external storage device. Moreover, according to the analysis result, the determination of a virtual viewpoint at another time or another position by a user may be requested from scene analyzer 145 via a terminal.

Tracker 144 tracks a specific subject based on the data on the three-dimensional model. The tracking result may be displayed with free-viewpoint video on the display of a terminal or the like. For example, if a specific subject cannot be tracked, the determination of a virtual viewpoint at another time or another position by a user may be requested from tracker 144 via a terminal.

Embodiment 3

Figure 11:
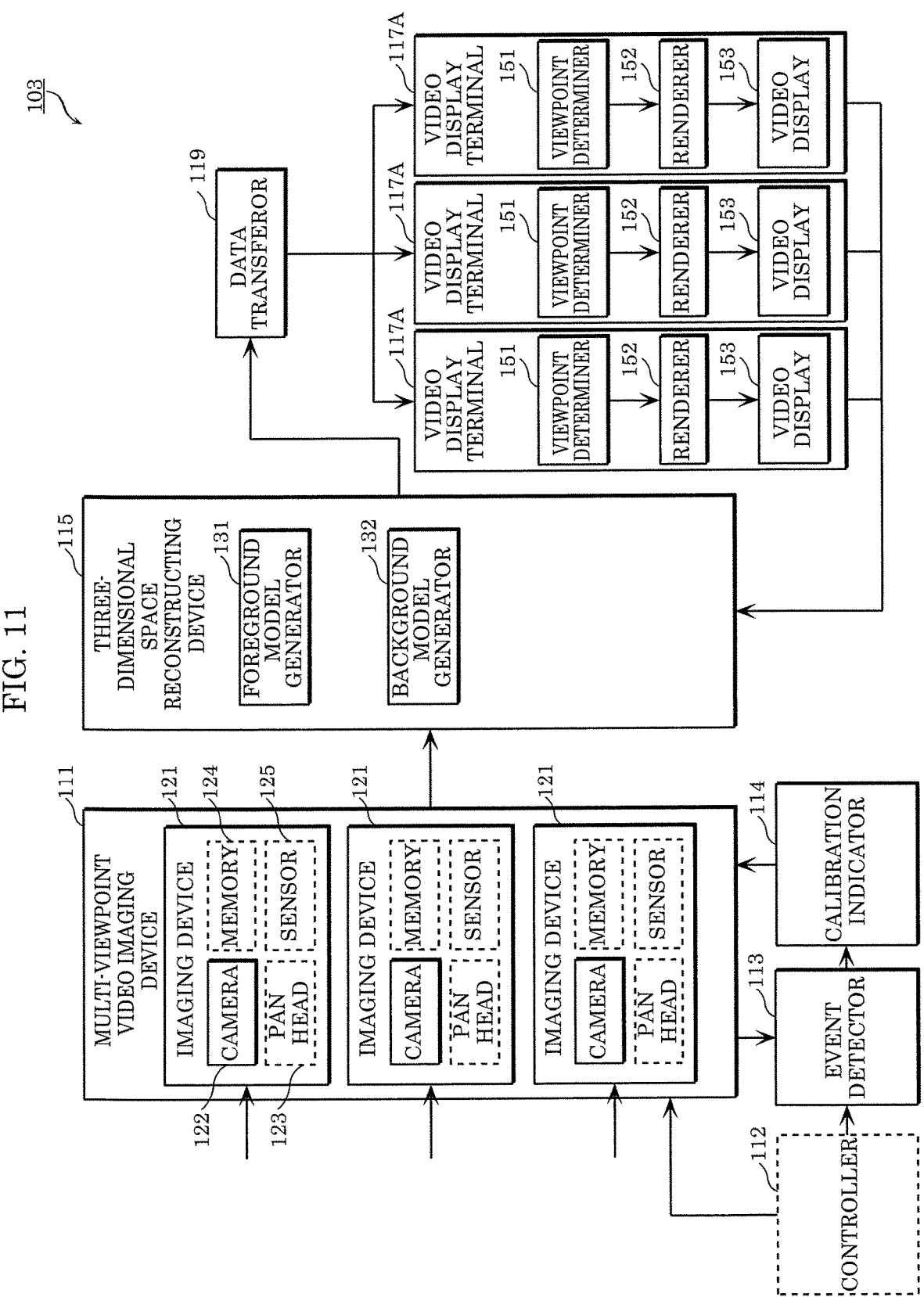
FIG. 11 is a block diagram illustrating the configuration of a free-viewpoint video generating system according to Embodiment 3.

In the present embodiment, a modification of free-viewpoint video generating system 101 according to Embodiment 1 will be described. FIG. 11 is a block diagram illustrating the configuration of free-viewpoint video generating system 103 according to the present embodiment. Free-viewpoint video generating system 103 in FIG. 11 is different from free-viewpoint video generating system 101 in FIG. 4 in that viewpoint determiner 151 and renderer 152 are provided in video display terminal 117A.

Data transferor 119 distributes a three-dimensional model (a foreground model and a background model) generated by three-dimensional space reconstructing device 115 to video display terminal 117A. Moreover, data transferor 119 may transmit video captured by multi-viewpoint video imaging device 111 and a camera parameter to video display terminal 117A. During the generation of a three-dimensional model, three-dimensional space reconstructing device 115 may add color information to the three-dimensional model by using captured video or the like and data transferor 119 may distribute the three-dimensional model with the added color information to video display terminal 117A. In this case, data transferor 119 may not distribute captured video to video display terminal 117A.

Video display terminal 117A includes a display, a radio, and a user input interface. A user uses video display terminal 117A and transmits, to event detector 113, a viewing request for viewing any region at any time in a shooting environment. Moreover, the user receives a three-dimensional model, captured video, and a camera parameter from data transferor 119 based on the viewing request. By using viewpoint information specified by the user and the received three-dimensional model, video display terminal 117A generates video at a viewpoint corresponding to the viewpoint information and outputs the generated video as free-viewpoint video to a display.

Figure 12:
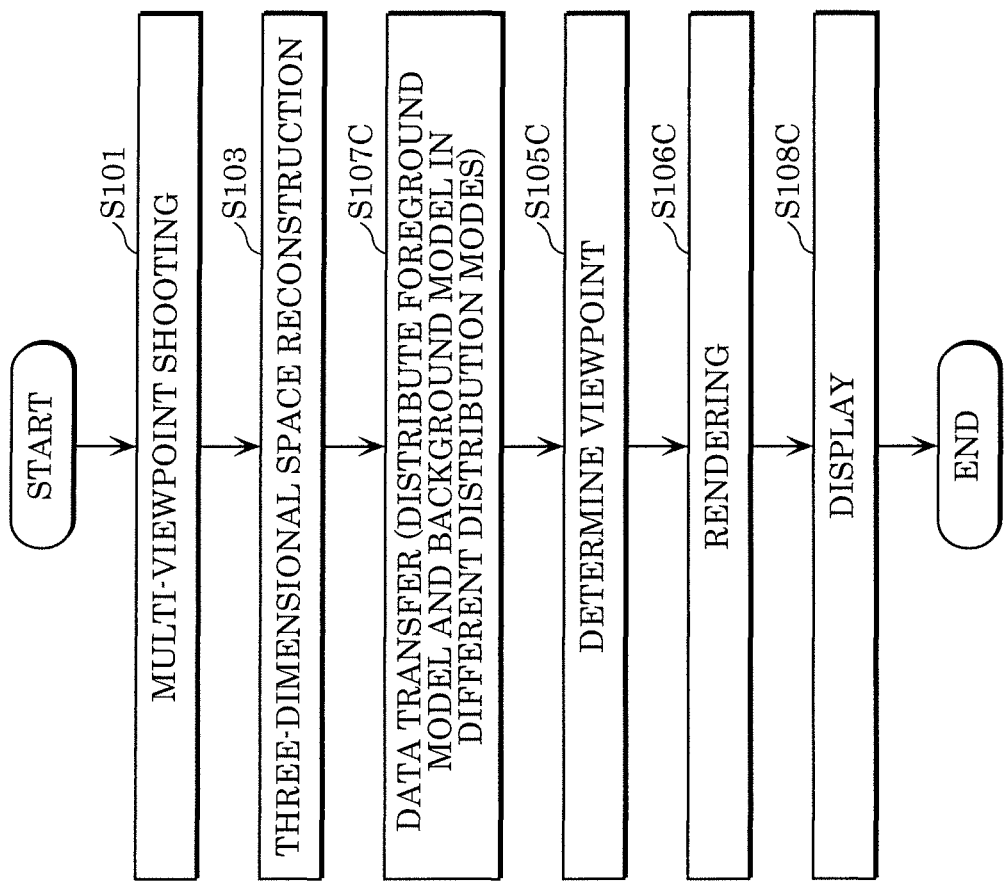
FIG. 12 is a flowchart showing the operations of the free-viewpoint video generating system according to Embodiment 3.

FIG. 12 is a flowchart showing the operations of free-viewpoint video generating system 103. Steps S101 and S103 are similar to processing in Embodiment 1 illustrated in FIG. 6.

Subsequently, data transferor 119 distributes a three-dimensional model (a foreground model and a background model) generated by three-dimensional space reconstructing device 115 to video display terminal 117A (S107C). At this point, data transferor 119 distributes the foreground model and the background model in different distribution modes.

For example, when the three-dimensional model is distributed to video display terminal 117A, data transferor 119 separately distributes the foreground model and the background model. At this point, data transferor 119 adds, for example, a flag or an identifier for discriminating between the foreground model and the background model, to header information or the like included in distributed data.

For example, the foreground model and the background model may have different distribution periods. The distribution period of the foreground model may be shorter than the distribution period of the background model. If the recorded frame rate of imaging device 121 is, for example, 30 frames per second, data transferor 119 distributes 30 foreground models per second according to the recorded frame rate of imaging device 121. Data transferor 119 distributes, for example, a single model as a background model.

Moreover, during the distribution of the foreground model, data transferor 119 may generate a differential model as a difference between a foreground model at the current time and a foreground model at a previous time, and then data transferor 119 may distribute the generated differential model. Furthermore, data transferor 119 may predict a motion of the foreground model, generate a prediction model from the foreground model at the previous time, generate a differential model as a difference between the foreground model at the current time and the prediction model, and then distribute the generated differential model and motion information indicating the result of motion prediction. This can reduce the amount of information on the foreground model, thereby suppressing the band of a network. Moreover, data transferor 119 may compress the amount of information on transmitted data by performing variable-length coding or arithmetic coding on the differential model and the motion information.

During the distribution of the background model, data transferor 119 may distribute the single background model when a user starts viewing. Alternatively, data transferor 119 may transmit the background model at predetermined regular intervals. At this point, data transferor 119 may generate a differential model as a difference between the current background model and the previously distributed background model, and then transmit the generated differential model. This can reduce the amount of information on the distributed background model, thereby suppressing the network band.

Data transferor 119 may transmit both of the foreground model and the background model at random access points.

Thus, video display terminal 117A can always generate free-viewpoint video by using proper foreground and background models when the user switches viewing times.

Figure 13:
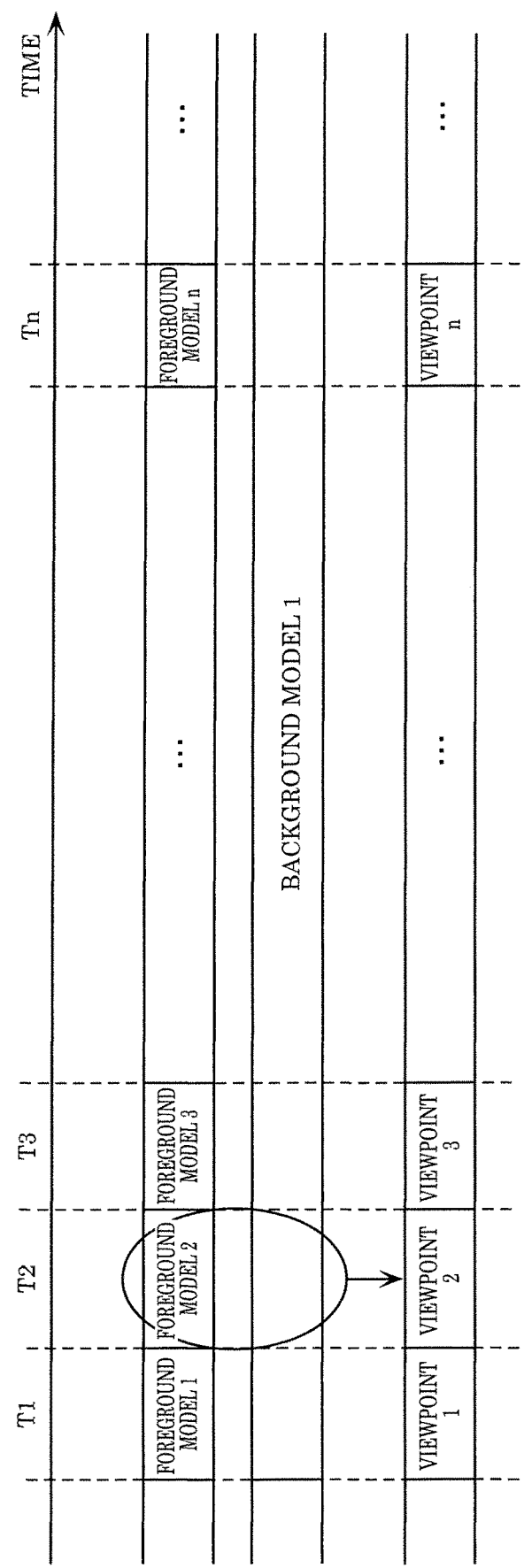
FIG. 13 shows a distribution example of a foreground model and a background model according to Embodiment 3.

FIG. 13 shows a distribution example of foreground models and a background model, the background model being distributed when the user starts viewing. As shown in FIG. 13, data transferor 119 distributes the background model when the user starts viewing. Video display terminal 117A generates free-viewpoint video by using the background model and the foreground model received at each time.

Figure 14:
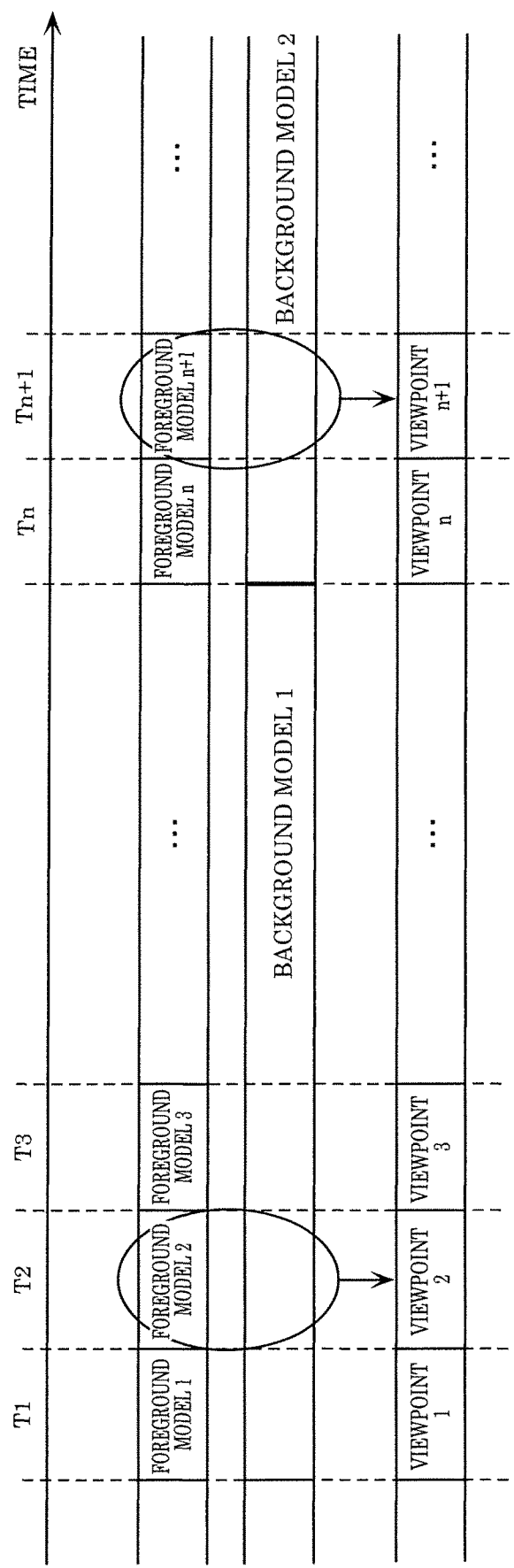
FIG. 14 shows a distribution example of the foreground model and the background model according to Embodiment 3.

FIG. 14 shows a distribution example of foreground models and background models, the background models being distributed at regular intervals. As shown in FIG. 14, data transferor 119 distributes the background models at predetermined regular intervals. In this case, the regular intervals are longer than the intervals for distributing the foreground models. Video display terminal 117A generates free-viewpoint video by using the previously received background model and the foreground model received at each time.

If the foreground models and the background models are encoded and distributed, data transferor 119 may switch an encoding method for each of the models. In other words, data transferor 119 may use different encoding methods for the foreground and background models. For example, for the foreground model, data transferor 119 uses an encoding method in which priority is placed on a low delay in order to perform instant replay on video display terminal 117A. For the background model, data transferor 119 uses an encoding method in which priority is placed on high efficiency in order to minimize the amount of information. Thus, a proper encoding method is selected according to the purpose of each model, thereby improving the functionality of the system while reducing the amount of data.

Data transferor 119 may use a high-efficient encoding method for the foreground model and a less efficient encoding method for the background model. For example, the background model is less frequently distributed and thus the use of the less efficient encoding method hardly increases a network load even when the amount of data increases. The use of the less efficient encoding method with a low throughput can suppress a processing load for the background model on a server or a terminal. The foreground model is frequently updated. Thus, even if the server or the terminal has a high processing load, the foreground model is encoded with maximum efficiency, thereby reducing the network load. Data transferor 119 may transfer the models without encoding according to the less efficient encoding method.

Alternatively, data transferor 119 may distribute the foreground model and the background model by using networks or protocols having different characteristics. For example, for the foreground model, data transferor 119 uses a high-speed network having a low packet loss and high reliability and a low-delay distribution protocol such as UDP (User Datagram Protocol) in order to perform instant replay on video display terminal 117A. For the background model, data transferor 119 uses a low-speed network and a protocol such as TCP (Transmission Control Protocol) having high error resistance in order to securely distribute the background model while obtaining the transmission band of the foreground model. Furthermore, the foreground model may be distributed with low delay by applying download distribution using HTTP (Hypertext Transfer Protocol) to the background model and stream distribution using RTP (Real-time Transport Protocol) to the foreground model.

Data transferor 119 may acquire viewpoint position information from video display terminal 117A during viewing of the user and switch the three-dimensional model to be distributed by using the information. For example, data transferor 119 may preferentially distribute the foreground model and the background model that are necessary for generating video from a viewpoint during viewing of the user. Moreover, data transferor 119 may distribute, with high precision (high density), the foreground model necessary for generating video from a viewpoint during viewing of the user, and distribute the other models with lower model precision (density) by thinning or the like. This can reduce the amount of distributed data. The background models may not be switched in this way.

Furthermore, data transferor 119 may change the density or the distribution period of the three-dimensional model to be distributed according to an available network band. For example, data transferor 119 may reduce the density of the three-dimensional model or increase the distribution period as the network band decreases. Video display terminal 117A may switch the resolution of rendering according to the density of the three-dimensional model distributed by data transferor 119. For example, in the case of a narrow network band, data transferor 119 distributes the three-dimensional model after reducing the density by thinning or the like. Moreover, video display terminal 117A displays video with a reduced rendering resolution.

As a method of reducing the density of the three-dimensional model, thinning may be evenly performed or the enabling and disabling of thinning or thinning methods may be switched depending on a target object. For example, data transferor 119 distributes an important subject with a dense three-dimensional model and distributes other subjects with sparse three-dimensional models. This can reduce the amount of distributed data while keeping the image quality of the important subject. In the case of a narrow network band, data transferor 119 may reduce the temporal resolution of the three-dimensional model to be distributed. For example, the distribution period of the foreground model may be increased.

FIG. 12 will be referred to again. Subsequently, video display terminal 117A performs three-dimensional space recognition by using the distributed three-dimensional model. First, viewpoint determiner 151 determines a virtual viewpoint (S105C). After that, renderer 152 performs rendering using the three-dimensional model, thereby generating free-viewpoint video that is video viewed from the virtual viewpoint (S106C). The processing is similar to that of steps S105 and S106 in Embodiment 1. Subsequently, video display 153 displays the generated free-viewpoint video (S108O).

When receiving the three-dimensional model from data transferor 119, video display terminal 117A may separately receive the foreground model and the background model. At this point, video display terminal 117A may analyze, for example, header information to acquire a flag or an identifier for identifying whether each model is a foreground model or a background model.

The foreground model and the background model may have different reception periods. The reception period of the foreground model may be shorter than that of the background model. If the recorded frame rate of imaging device 121 is, for example, 30 frames per second, video display terminal 117A receives 30 foreground models per second according to the recorded frame rate of imaging device 121. Moreover, video display terminal 117A receives one model as a background model.

During the reception of the foreground model, video display terminal 117A may receive a differential model as a difference between a foreground model at the current time and a foreground model at a previous time, and may generate the foreground model at the current time by adding the foreground model at the previous time and the differential model. Furthermore, video display terminal 117A may receive the differential model and motion information indicating the result of motion prediction, generate a prediction model from the received motion information and the foreground model at the previous time, and add the differential model and the prediction model so as to generate the foreground model at the current time. This can reduce the amount of information on the foreground model to be received, thereby suppressing the band of the network. If the differential model and the motion information are compressed by variable-length coding or arithmetic coding, video display terminal 117A may decode the differential model and the motion information by performing variable-length decoding or arithmetic decoding.

During the reception of the background model, video display terminal 117A may receive the single background model when the user starts viewing, and the background model may be used at all times. Alternatively, video display terminal 117A may receive the background model at predetermined regular intervals. At this point, video display terminal 117 receives a differential model as a difference between a previously received background model and a current background model and may generate the current background model by adding the previous background model and the differential model. This can reduce the amount of information on the received background model, thereby suppressing the network band.

Video display terminal 117A may receive both of the foreground model and the background model at random access points. Thus, video display terminal 117A can always generate free-viewpoint video by using proper foreground and background models when the user switches viewing times.

If the three-dimensional model cannot be received by a network error or the like, video display terminal 117A may perform rendering by using a received three-dimensional model. For example, if the foreground model cannot be received, video display terminal 117A may generate a prediction model by predicting a motion from the received foreground model and use the generated prediction model as a foreground model at the current time. If the background model cannot be received, video display terminal 117A may use the received background model or a CG model. If the background model or the foreground model cannot be received, video display terminal 117A may use a prepared model or rendering image, e.g., a CG image. Thus, even if the three-dimensional model cannot be received, video display terminal 117A can provide a rendering image for the user.

Data transferor 119 may distribute, to video display terminal 117A, at least one of a camera parameter, captured video, a background image, and a background subtracted image that are obtained by multi-viewpoint video imaging device 111, time information during the generation of each shot video or a three-dimensional model, viewpoint position information at the start of rendering, and time information for rendering.

If imaging device 121 is a stationary camera, data transferor 119 may distribute the camera parameter to video display terminal 117A only at the start of viewing. Alternatively, data transferor 119 may distribute the camera parameter to video display terminal 117A when calibration is performed by calibration indicator 114. If imaging device 121 is not stationary, data transferor 119 may distribute the camera parameter to video display terminal 117A each time the camera parameter is updated.

Moreover, data transferor 119 may encode and distribute shot video, a background image, or a background subtracted image that are obtained by multi-viewpoint video imaging device 111. This can reduce the amount of transmitted data. For example, data transferor 119 may use a multi-view codec (MVC) based on H.264 or H.265 according to a correlation between multi-viewpoint images. Alternatively, data transferor 119 may separately encode and distribute the videos of imaging devices 121 based on H.264 or H.265. This can reduce the amount of data distributed to video display terminal 117A.

The viewpoint position information at the start of rendering may be specified by the user through video display terminal 117A upon startup. Viewpoint determiner 151 may change a viewpoint position depending on the style of viewing through video display terminal 117A or the kind of video display terminal 117A. For example, in the case of viewing on television, viewpoint determiner 151 determines, as a starting viewpoint, a viewpoint recommended by the system, a viewpoint from imaging device 121 close to a ball, a viewpoint from imaging device 121 that shots the center of a field, or a viewpoint where a high rating is obtained. In the case of viewing on a personal terminal, e.g., a user's tablet or smartphone, viewpoint determiner 151 determines a viewpoint for viewing of a user's favorite player as a starting viewpoint. In the case of viewing on a head mounted display, viewpoint determiner 151 determines a recommended viewpoint for VR (Virtual Reality), e.g., an athlete's viewpoint on a field or a viewpoint from a bench as a starting viewpoint.

Embodiment 4

Figure 15:
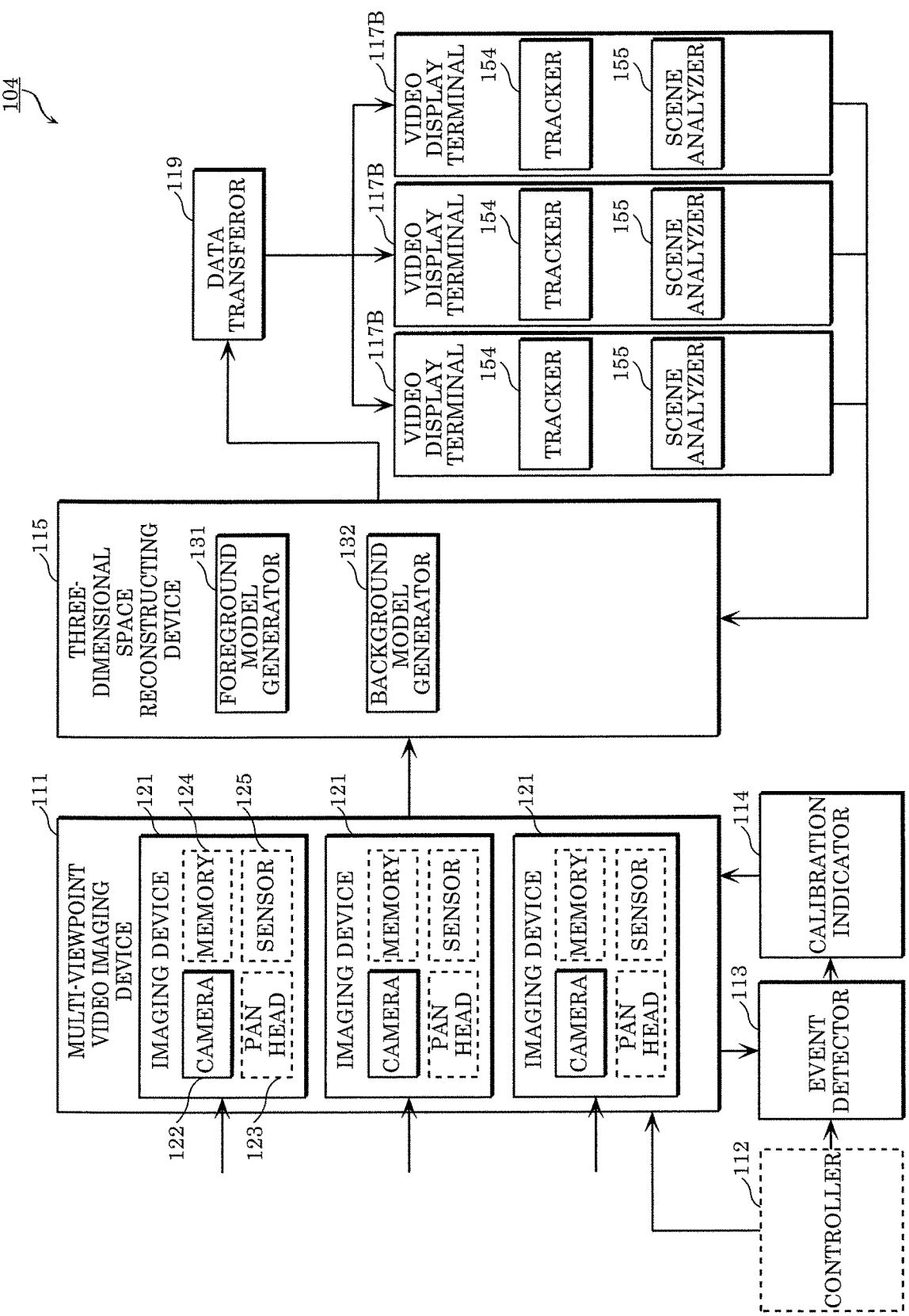
FIG. 15 is a block diagram illustrating the configuration of a next-generation monitoring system according to Embodiment 4.

In the present embodiment, a modification of next-generation monitoring system 102 according to Embodiment 2 will be described. FIG. 15 is a block diagram illustrating the configuration of next-generation monitoring system 104 according to the present embodiment. Next-generation monitoring system 104 in FIG. 15 is different from next-generation monitoring system 102 in FIG. 8 in that tracker 154 and scene analyzer 155 are provided in video display terminal 117B.

Figure 16:
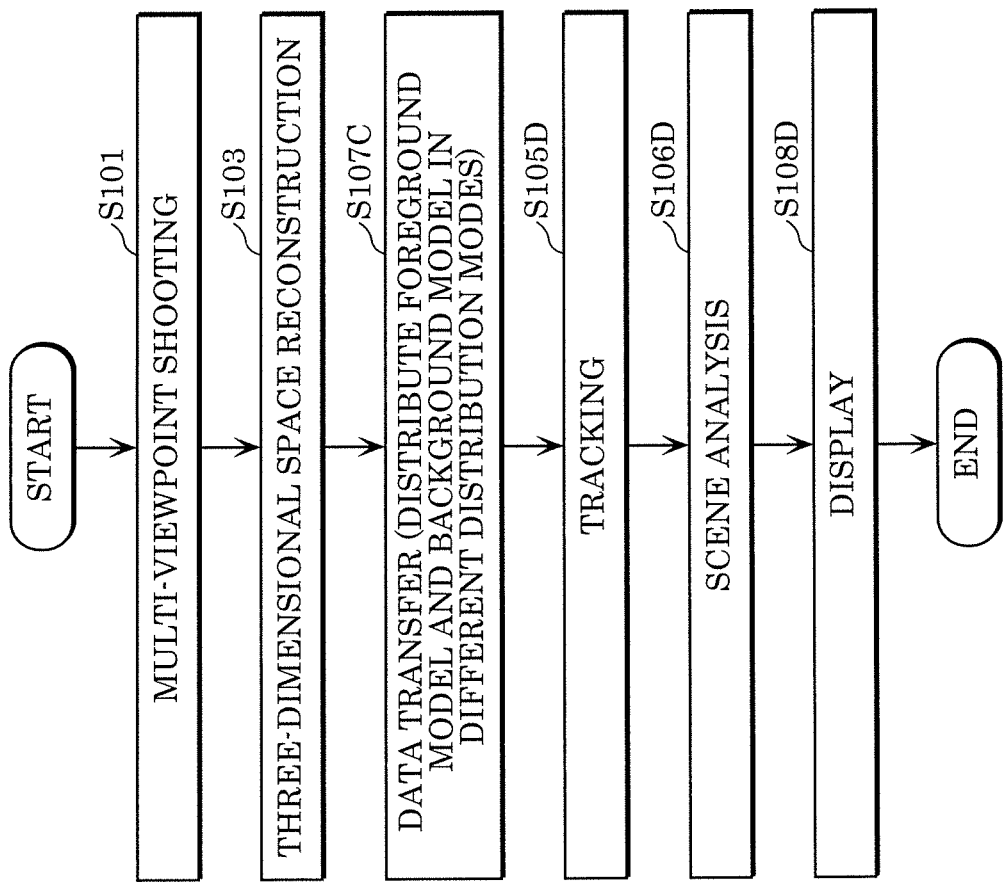
FIG. 16 is a flowchart showing the operations of the next-generation monitoring system according to Embodiment 4.

FIG. 16 is a flowchart showing the operations of next-generation monitoring system 104. Steps S101, S103, and S107C are similar to processing in Embodiment 3 illustrated in FIG. 12.

Subsequently, video display terminal 117B performs three-dimensional space recognition by using a three-dimensional model. Specifically, tracker 154 tracks a person on a three-dimensional space (S105D). Scene analyzer 155 analyzes a scene (S106D). Video display terminal 117B displays the result of three-dimensional space recognition (S108D). The processing is similar to that of steps S105B, S106B, and S108B in Embodiment 2.

Embodiment 5

The foregoing embodiments described examples in which the foreground model and the background model are included in the three-dimensional model. Models included in the three-dimensional model are not limited to the foreground model and the background model.

Figure 17:
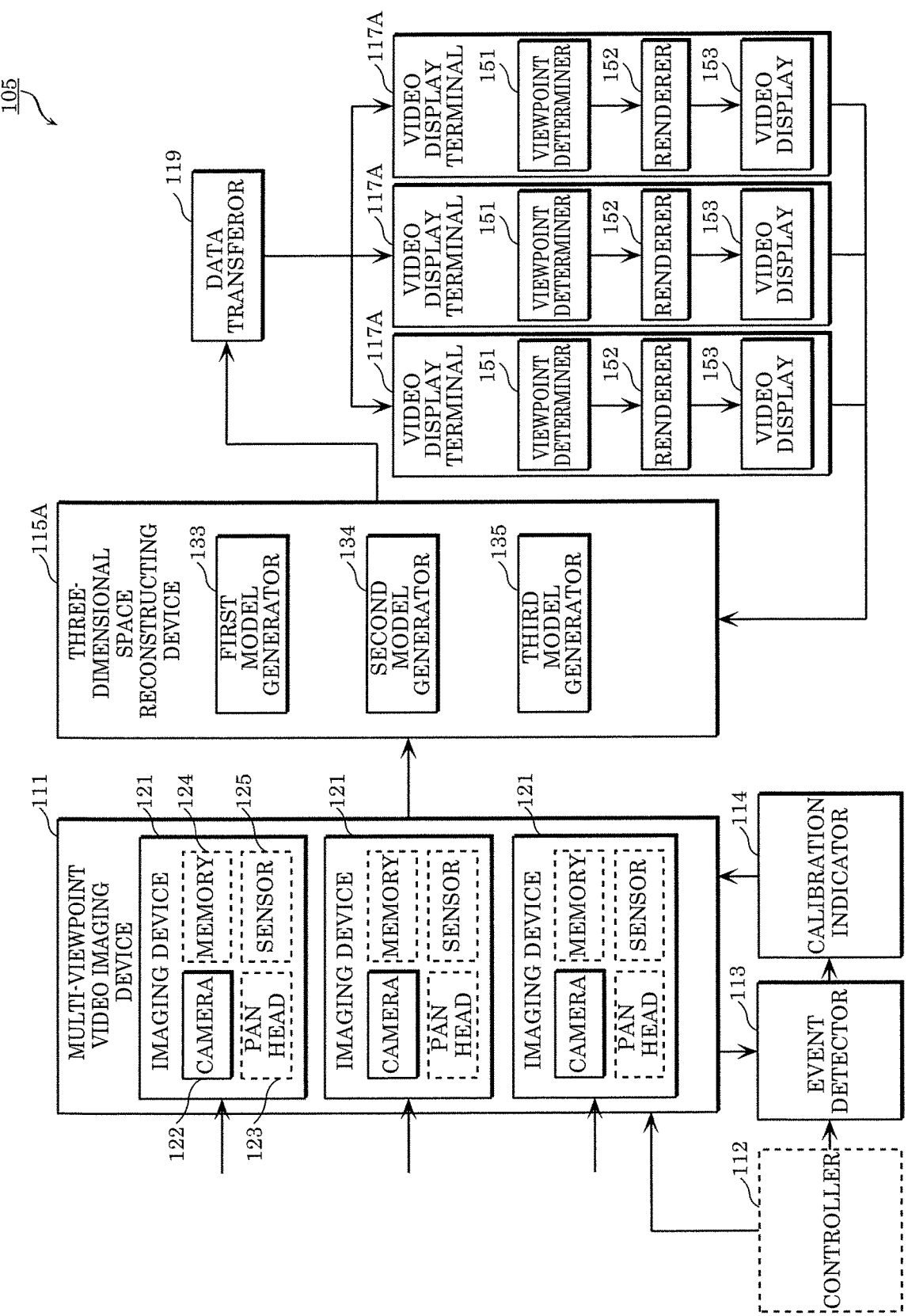
FIG. 17 is a block diagram illustrating a free-viewpoint video generating system according to Embodiment 5.

FIG. 17 is a block diagram illustrating the configuration of free-viewpoint video generating system 105 according to the present embodiment. Free-viewpoint video generating system 105 in FIG. 17 is different from free-viewpoint video generating system 103 in FIG. 11 in the configuration of the three-dimensional space reconstructing device 115A. Three-dimensional space reconstructing device 115A includes first model generator 133 for generating a first model, second model generator 134 for generating a second model, and third model generator 135 for generating a third model.

Three-dimensional space reconstructing device 115A generates a three-dimensional model including the first model, the second model, and the third model. Data transferor 119 distributes the first to third models to video display terminal 117A in different distribution modes. Three-dimensional space reconstructing device 115A updates the models with different frequencies. Data transferor 119 distributes the models to video display terminal 117A with different periods. For example, the first model is a foreground model, the second model is a part of a background model, and the third model is a background model other than the second model. In this case, if the recorded frame rate of imaging device 121 is, for example, 30 frames per second, data transferor 119 distributes 30 first models per second according to the recorded frame rate of imaging device 121. Moreover, data transferor 119 distributes the single second model per second and distributes one model as the third model at the start of viewing. Thus, regions updated with different frequencies in the background model can be distributed as different models with different periods, thereby suppressing a network band.

Data transferor 119 may add identifiers for identifying two or more models to the three-dimensional model. Thus, by analyzing the identifiers, video display terminal 117A can identify the model corresponding to the received three-dimensional model.

In this example, the three models are used. Four or more models may be used instead.

If two models are used, the two models may not be a foreground model or a background model. For example, three-dimensional data may include a first model frequently updated with a large amount of data and a second model less frequently updated with a small amount of data. Data transferor 119 may distribute the models to video display terminal 117A in different distribution modes. At this point, the models are updated with different frequencies and thus data transferor 119 distributes the models to video display terminal 117A with different periods. If the recorded frame rate of imaging device 121 is, for example, 30 frames per second, data transferor 119 distributes 30 first models per second according to the recorded frame rate of imaging device 121. Moreover, data transferor 119 distributes one model as the second model at the start of viewing. Thus, three-dimensional models with different amounts of data can be distributed with different periods, thereby suppressing the network band.

The first model and the second model may vary in significance. Data transferor 119 may distribute the models to video display terminal 117A in different distribution modes. At this point, the models vary in significance and thus data transferor 119 distributes the models to video display terminal 117A with different periods. For example, the first model is more significant while the second model is less significant. In this case, if the recorded frame rate of imaging device 121 is, for example, 30 frames per second, data transferor 119 distributes 30 first models per second and 15 second models per second according to the recorded frame rate of imaging device 121. Thus, the significant three-dimensional model can be preferentially distributed, thereby providing the user of video display terminal 117A with proper rendering video while suppressing the network band.

Data transferor 119 may switch, for example, densities other than the distribution periods according to the significance. For example, data transferor 119 may switch the densities of the models according to the priority. If data transferor 119 distributes a three-dimensional model in, for example, a soccer game, it is determined that the three-dimensional model of players playing in front of a goal is more significant while the three-dimensional model of a goal keeper near the other goal is less significant. Subsequently, data transferor 119 distributes the three-dimensional model of the goal keeper with a lower density than the more significant three-dimensional model. Data transferor 119 may not distribute the less significant three-dimensional model. Moreover, data transferor 119 determines the level of significance depending on, for example, whether the target model is close to a specific feature point or an object such as a ball or is close to a viewpoint position of many viewers. For example, a model close to a specific feature point or an object is significant and a model close to a viewpoint position viewed by many viewers is set to be significant.

Each of the models may be a set of at least one object (e.g., a person, a ball, or an automobile) identified by object recognition or the like or a set of regions such as a background and a foreground or objects that are identified according to motions.

Figure 18:
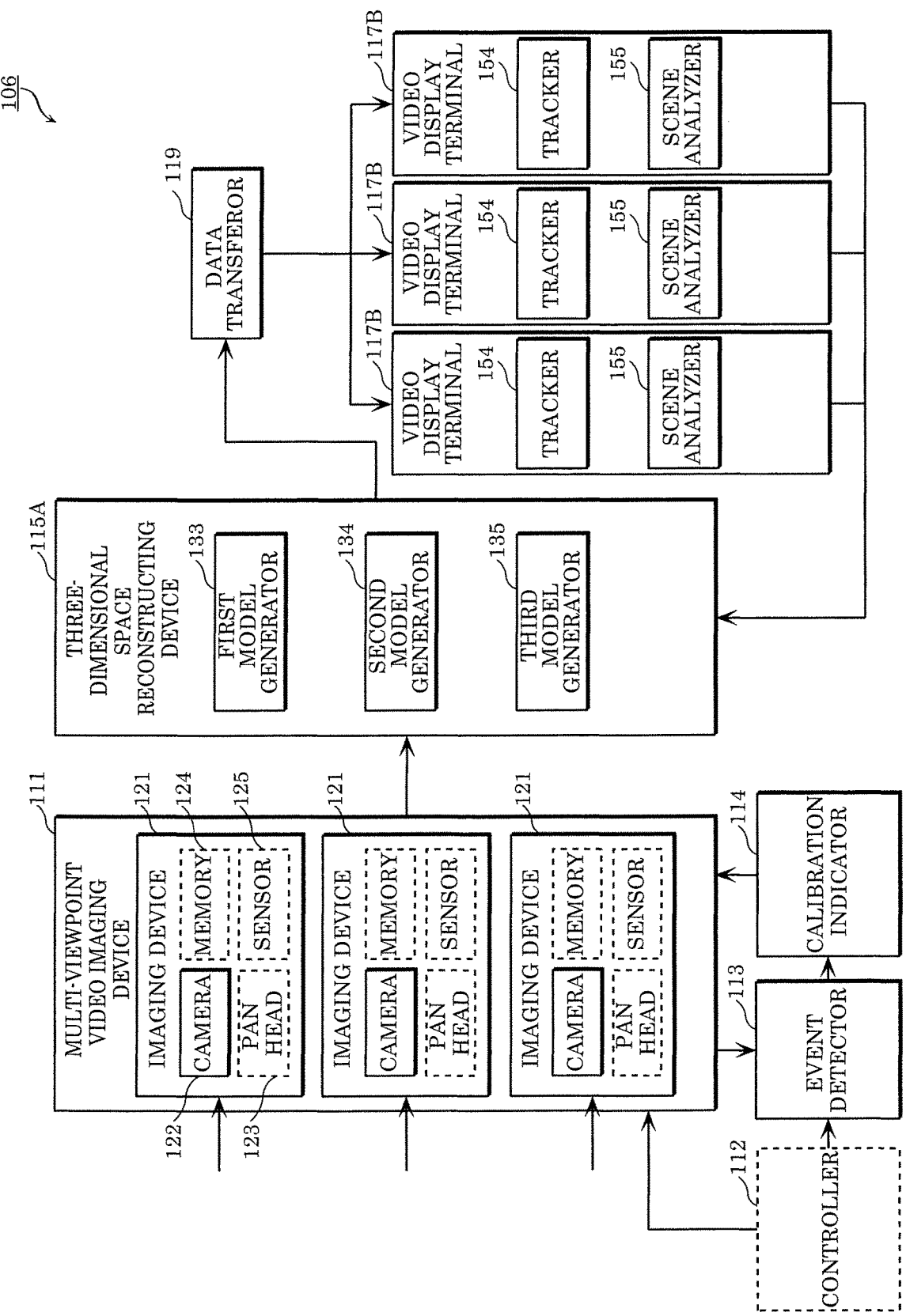
FIG. 18 is a block diagram illustrating the configuration of a next-generation monitoring system according to Embodiment 5.

The same modification is applicable to next-generation monitoring system 104 described in Embodiment 4. FIG. 18 is a block diagram illustrating the configuration of next-generation monitoring system 106 according to the present embodiment. Next-generation monitoring system 106 in FIG. 18 is different from next-generation monitoring system 104 in FIG. 15 in the configuration of three-dimensional space reconstructing device 115A. The functions of three-dimensional space reconstructing device 115A are similar to those of FIG. 17.

As described in Embodiments 1 to 4, the three-dimensional model distribution device (for example, data transferor 119) distributes a first model (e.g., a foreground model), which is a three-dimensional model of a target space in a target time period, in a first distribution mode and distributes a second model (e.g., a background model), which is a three-dimensional model of a target space in a target time period and makes a smaller change per unit time than the first model, in a second distribution mode different from the first distribution mode. In other words, the three-dimensional model distribution device separately transmits the foreground model and the background model.

For example, the transmission periods of the first model and the second model are different from each other. For example, the distribution period of the first distribution mode is shorter than that of the second distribution mode. The three-dimensional model distribution device transmits the first model at predetermined regular intervals. At this point, the three-dimensional model distribution device may transmit a differential model as a difference between the first model at the current time and the first model at a previous time. Furthermore, for the first model at the current time, the three-dimensional model distribution device may transmit motion information from the first model at the previous time.

For example, the three-dimensional model distribution device transmits the second model at the start of viewing. Moreover, the three-dimensional model distribution device transmits the second model at predetermined regular intervals. Furthermore, the three-dimensional model distribution device may transmit a differential model as a difference between the current second model and the previously transmitted second model. The three-dimensional model distribution device may transmit the second model at each random access point.

The three-dimensional model distribution device may transmit information such as a flag for discriminating between the first model and the second model.

The three-dimensional model distribution device may transmit both of the first model and the second model at random access points.

The three-dimensional model distribution device may generate the first model and the second model according to different methods. Specifically, the three-dimensional model distribution device generates the first model according to a first generating method and generates the second model according to a second generating method having different accuracy from the first generating method. For example, the three-dimensional model distribution device generates the first model according to the first generating method and generates the second model according to the second generating method having higher accuracy than the first generating method. Alternatively, the three-dimensional model distribution device generates the first model according to the first generating method and generates the second model according to the second generating method having lower accuracy than the first generating method. For example, if it is necessary to render the first model (foreground model) of a player or a criminal with maximum image quality, the three-dimensional model distribution device generates the first model with high accuracy even when the amount of data increases. In the meantime, the three-dimensional model distribution device suppresses the amount of data by reducing the accuracy of the second model of audience or a background image that is a less significant region than a foreground.

For example, from a third model that is a three-dimensional model of a plurality of objects included in a target space in a target time period and the second model (background model) that is a three-dimensional model of some of the objects included in the target space in the target time period, the three-dimensional model distribution device generates the first model (foreground model) as a difference between the third model and the second model.

For example, the three-dimensional model distribution device generates a third multi-viewpoint image (background subtracted image) as a difference between a first multi-viewpoint image (shot image) of a plurality of objects included in a target space in a target time period and a second multi-viewpoint image (background image) of some of the objects and generates the first model (foreground model) by using the third multi-viewpoint image (background subtracted image).

Alternatively, the three-dimensional model distribution device may generate the first model according to a visual hull method by using the second multi-viewpoint image (captured image) or the third multi-viewpoint image (background subtracted image) and generate the second model by using the matching results of feature points between cameras. This can reduce a throughput for generating the first model and improve the accuracy of the second model. The three-dimensional model distribution device may manually generate the second model.

The three-dimensional model distribution device may distribute data other than the three-dimensional model. For example, the data other than the three-dimensional model includes at least one of a camera parameter, a multi-viewpoint image, a background subtracted image, time information, and a starting viewpoint position.

Alternatively, the three-dimensional model distribution device may distribute the camera parameter of a stationary camera at the start of viewing and distribute the camera parameter of an unfixed camera each time the camera parameter is changed.

The viewpoint position at the start of viewing may be specified by a user at the start of viewing. The viewpoint position at the start of viewing may be changed depending on the style of viewing or the kind of a terminal. For example, in the case of viewing on television, a recommended viewpoint is selected, one of stationary cameras (e.g., near a ball or at the center of a field) is selected, or a viewpoint having a high rating is selected. In the case of viewing on a personal tablet or smartphone, a viewpoint for viewing a favorite player is selected. In the case of viewing on a head mounted display, a recommended viewpoint for VR (e.g., a viewpoint on a field) is selected.

The first model and the second model are not limited to the foreground model and the background model. Alternatively, two or more models may be generated and distributed in different distribution modes. In this case, the models are updated with different frequencies (the frequency of updating varies among regions on the background) and thus the three-dimensional model distribution device distributes the models with different periods. Moreover, the three-dimensional model distribution device adds identifiers for identifying two or more models.

Furthermore, the three-dimensional model distribution device switches an encoding method for each of the models.

For example, a first encoding method is used in the first distribution mode used for the first model. A second encoding method is used in the second distribution mode used for the second model. The first encoding method and the second encoding method vary in at least one of processing delay and encoding efficiency. For example, the second encoding method has a larger processing delay than the first encoding method. Moreover, the second encoding method has higher encoding efficiency than the first encoding method. Alternatively, the second encoding method has lower encoding efficiency than the first encoding method.

The first distribution mode may have a lower delay than the second distribution mode. For example, the three-dimensional model distribution device distributes the first model with a low delay via a reliable line (for example, UDP is used). Moreover, the three-dimensional model distribution device distributes the second model via a low-speed line (e.g., TCP is used). Alternatively, the three-dimensional model distribution device may distribute the second model in a downloadable manner (e.g., HTTP) and stream the first model (e.g., RTP).

If the three-dimensional model cannot be received by a network error or the like, a received three-dimensional model may be used by a three-dimensional model receiver (e.g., video display terminal 117A). For example, if the first model cannot be received, the three-dimensional model receiver generates a prediction model by predicting a motion from the received first model and uses the generated prediction model as a first model at the current time.

If the second model cannot be received, the three-dimensional model receiver uses the received second model. Alternatively, the three-dimensional model receiver uses a prepared model or a rendering image, e.g., a CG model or a CG image. In other words, the three-dimensional model receiver may perform error concealment on the first model and the second model in different ways.

The three-dimensional model distribution device may preferentially distribute the first model and the second model that are necessary for generating video from a user's viewpoint. For example, the three-dimensional model distribution device may distribute a first model necessary for generating video from a user's viewpoint with high accuracy and thin other first models. In other words, terminals (e.g., video display terminal 117A) at the distribution destinations of the first model and the second model generate free-viewpoint video from selected viewpoints by using the first model and the second model. The three-dimensional model distribution device preferentially distributes the first model necessary for generating free-viewpoint video.

The three-dimensional model distribution device may change the quality of a three-dimensional model to be distributed according to a usable network band. For example, the three-dimensional model distribution device changes the density or rendering resolution of the three-dimensional model according to the network band. In the case of a strict band, the three-dimensional model distribution device reduces the density of the three-dimensional model so as to lower the rendering resolution. The density of the three-dimensional model can be changed by, for example, uniform thinning or switching densities according to a target object. In the case of a strict band, the three-dimensional model distribution device reduces the temporal resolution of the three-dimensional model to be distributed. For example, the distribution period of the first model is increased.

In the examples of the foregoing description, the three-dimensional model is generated using multi-viewpoint video obtained by multi-viewpoint video imaging device 111. The method of generating the three-dimensional model (the foreground model and the background model) is not limited to the foregoing description. For example, the three-dimensional model may be generated using information obtained by means other than a camera, e.g., LIDAR (Light Detection and Ranging) or TOF (Time of Flight). Moreover, the information may be used to generate multi-viewpoint video used for generating the three-dimensional model.

The three-dimensional model may be generated in any form as long as the information indicates the three-dimensional position of a target object. For example, the three-dimensional model may be generated in the forms of point clouds, voxels, meshes, polygons, or depth information.

Embodiment 6

In the present embodiment, three-dimensional space reconstructing device 115C generates at least one depth image from a three-dimensional model, compresses the generated depth image, and distributes the depth image to video display terminal 117C. Video display terminal 117C restores the three-dimensional model from the received depth image. The depth image is efficiently compressed and distributed so as to suppress a network band during the distribution.

Figure 19:
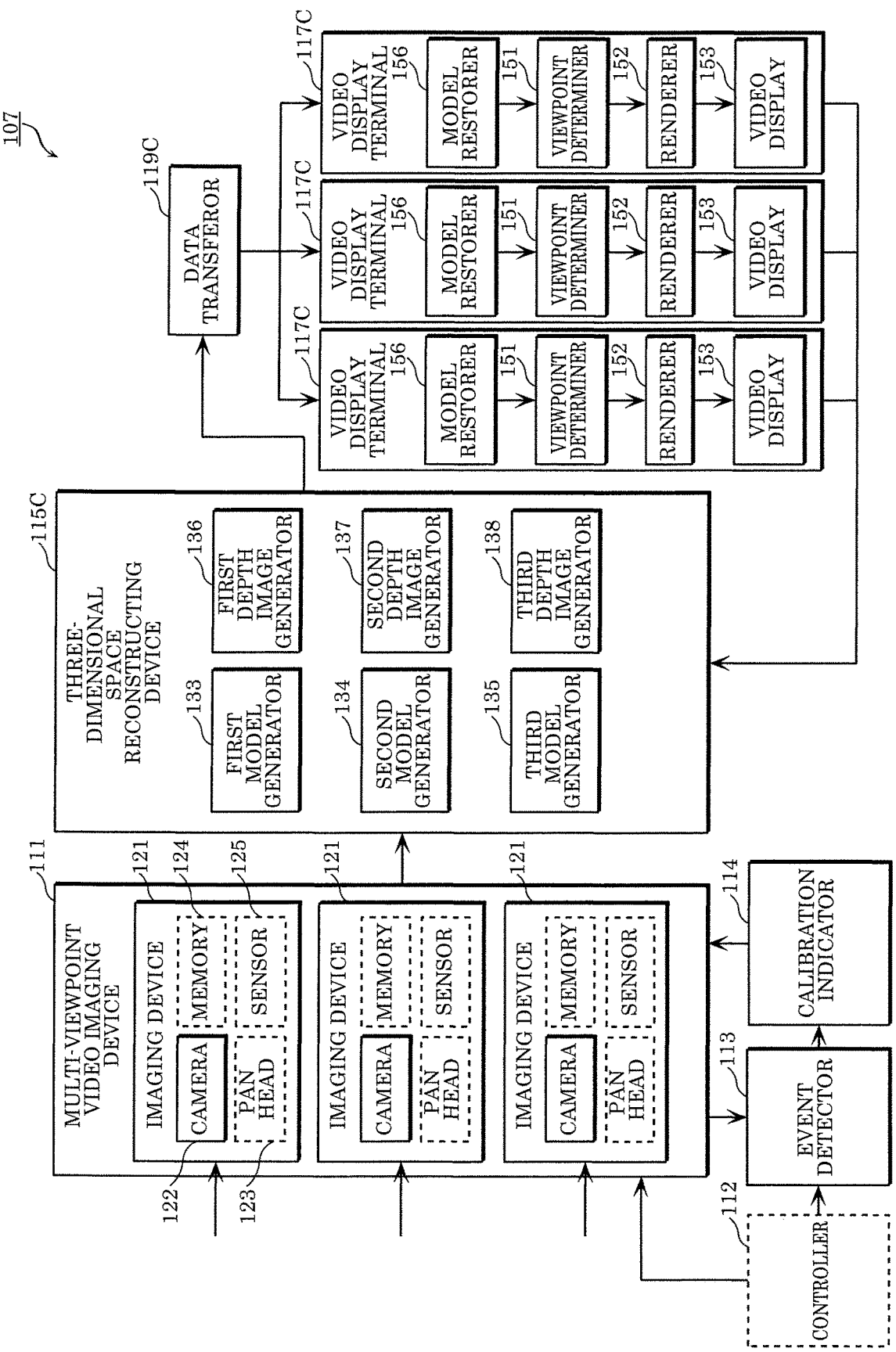
FIG. 19 is a block diagram illustrating the configuration of a free-viewpoint video generating system according to embodiment 6.

FIG. 19 is a block diagram illustrating the configuration of free-viewpoint video generating system 107 according to the present embodiment. Free-viewpoint video generating system 107 in FIG. 19 is different from free-viewpoint video generating system 105 in FIG. 17 in the configurations of the three-dimensional space reconstructing device 115C, data transferor 119C, and video display terminal 117C. Three-dimensional space reconstructing device 115C includes first depth image generator 136, second depth image generator 137, and third depth image generator 138 in addition to the configuration of three-dimensional space reconstructing device 115A. Video display terminal 117C includes model restorer 156 in addition to the configuration of video display terminal 117A.

Three-dimensional space reconstructing device 115C does not distribute a three-dimensional model but generates at least one depth image (distance image) from a created three-dimensional model. Data transferor 119C distributes at least one generated depth image to video display terminal 117C. In this case, video display terminal 117C receives at least one depth image, restores (generates) the three-dimensional model, and generates a rendering image by using the restored three-dimensional model and a received captured image.

Figure 20:
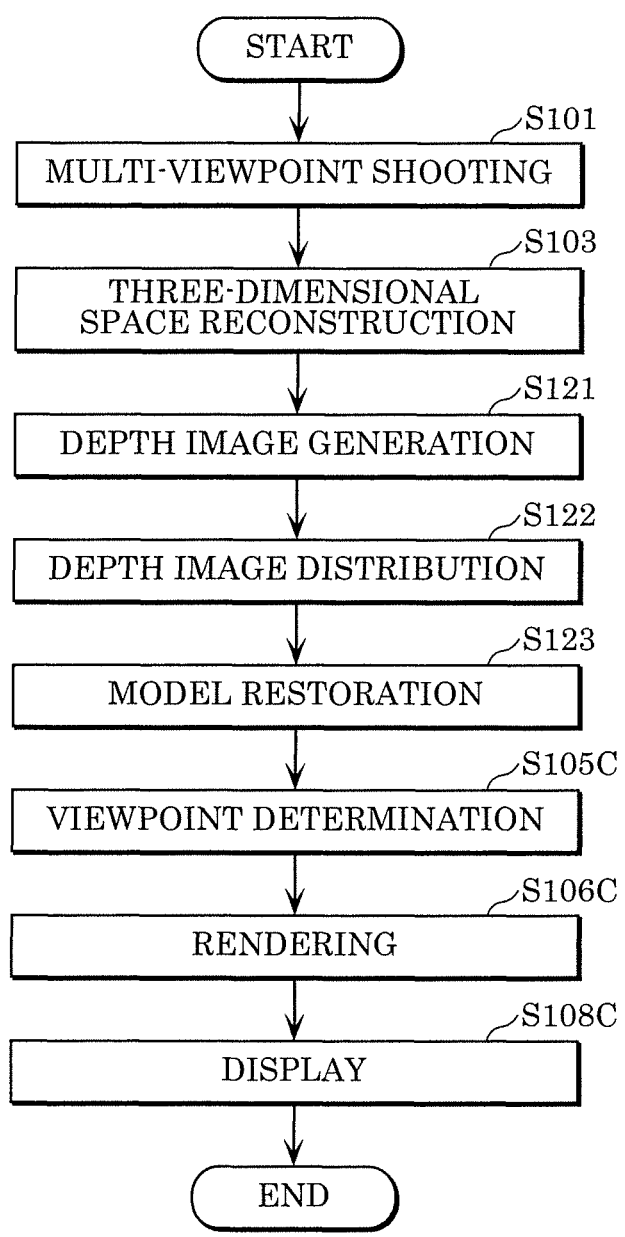
FIG. 20 is a flowchart showing the operations of the free-viewpoint video generating system according to embodiment 6.

FIG. 20 is a flowchart showing the operations of free-viewpoint video generating system 107. The processing in FIG. 20 is different from that of FIG. 12 in that step S107C is replaced with steps S121 to S123.

In steps S101 and S103, first model generator 133, second model generator 134, and third model generator 135 generate a first model, a second model, and a third model as in embodiment 5.

Subsequently, first depth image generator 136 generates at least one first depth image from the first model, second depth image generator 137 generates at least one second depth image from the second model, and third depth image generator 138 generates at least one third depth image from the third model (S121).

Data transferor 119C then performs, for example, two-dimensional image compression on the generated first depth image, second depth image, and third depth image, thereby reducing the data amount of the depth images. Thereafter, data transferor 119C distributes the compressed first depth image, second depth image, and third depth image to video display terminal 117C (S122).

Model restorer 156 of video display terminal 117C then decodes the received first depth image, second depth image, and third depth image. Model restorer 156 restores (generates) the first model by using the first depth image, restores (generates) the second model by using the second depth image, and restores (generates) the third model by using the third depth image (S123).

Thereafter, viewpoint determiner 151 determines a viewpoint requested by a user as in embodiment 5 (S105C). Renderer 152 generates a rendering image, which is an image viewed from the determined viewpoint, by using the restored first to third models and a received captured image (S106C). Video display 153 displays the rendering image (S108C).

As described above, data transferor 119C distributes the depth images, which are two-dimensional images, instead of a three-dimensional model. Thus, data transferor 119C can transmit compressed depth images according to a standard image compression scheme such as H.264 or H.265, thereby suppressing the amount of transferred data.

The first to third models may be configured in the forms of points (point clouds), meshes, or polygons.

In this example, the first to third models are generated as in embodiment 5. The same method is applicable to the generation of a foreground model and a background model as in embodiments 1 to 4.

Moreover, the same method is applicable to the generation of a three-dimensional model.

The free-viewpoint video generating system was described in this example. The same method is also applicable to a next-generation monitoring system.

In addition to a depth image, three-dimensional space reconstructing device 115C may distribute a camera parameter corresponding to the depth image. For example, the camera parameter is a camera parameter at the viewpoint of the depth image. The camera parameter includes an internal parameter indicating the focal length of a camera and an image center or the like and an external parameter indicating the orientation of the camera (three-dimensional position and orientation) or the like. Three-dimensional space reconstructing device 115C generates a depth image from a three-dimensional model by using the camera parameter.

Information to be transmitted is not limited to the camera parameter and may be any parameter used when a depth image is generated from a three-dimensional model. In other words, the parameter may be any parameter for projecting a three-dimensional model to a predetermined viewpoint (the viewpoint of a depth image) imaging plane. For example, the parameter may be a projection matrix calculated using the camera parameter.

Video display terminal 117C generates a three-dimensional model by projecting the pixels of at least one depth image by using the received camera parameter.

Three-dimensional space reconstructing device 115C may generate a plurality of depth images captured by projecting a three-dimensional model on the same plane as the imaging planes of imaging devices 121. This aligns the viewpoint positions of a captured image and the depth images. Therefore, for example, if data transferor 119C compresses images captured from multiple viewpoints of multi-viewpoint video imaging device 111 through multi-view encoding that is an extension standard of H.264 or H.265, parallax information between the captured images can be calculated using the depth images and a predicted image between the viewpoints can be generated using the parallax information. This can reduce the encoding amount of the captured image.

Alternatively, three-dimensional space reconstructing device 115C may generate a depth image by projecting a three-dimensional model on the same plane as the imaging plane of a viewpoint different from that of imaging device 121. In other words, the viewpoint of the depth image may be different from that of a captured image. For example, three-dimensional space reconstructing device 115C generates a depth image by projecting a three-dimensional model to a viewpoint position where the three-dimensional model is easily restored by video display terminal 117C. Thus, video display terminal 117C can generate a three-dimensional model with few errors. The viewpoint where a three-dimensional model is easily restored by video display terminal 117C is, for example, a viewpoint from which more objects are viewable.

Furthermore, data transferor 119C may compress and transmit a depth image. For example, data transferor 119C may compress (encode) a depth image according to a two-dimensional image compression scheme such as H.264 or H.265. Data transferor 119C may compress the depth images of different viewpoints according to dependence between the depth images as in a multi-view encoding mode. For example, data transferor 119C may generate a predicted image between viewpoints by using the parallax information calculated from the camera parameter.

Three-dimensional space reconstructing device 115C may determine a bit length, which indicates the value of each pixel of a depth image, such that an error between a three-dimensional model generated by three-dimensional space reconstructing device 115C and a three-dimensional model restored by video display terminal 117C is not larger than a constant value. For example, three-dimensional space reconstructing device 115C may set the bit length of a depth image at a first bit length (e.g., 8 bits) at a short distance to a subject or set the bit length at a second bit length (e.g., 16 bits), which is longer than the first bit length, at a long distance to a subject. Moreover, three-dimensional space reconstructing device 115C may adaptively change the bit length according to a distance to a subject. For example, three-dimensional space reconstructing device 115C may shorten the bit length as a distance to a subject increases.

As described above, three-dimensional space reconstructing device 115C controls the bit length of a depth image to be distributed, according to the error of a three-dimensional model restored by video display terminal 117C. Thus, the error of the three-dimensional model restored by video display terminal 117C can be suppressed within a permissible range; meanwhile, the network load can be reduced by cutting the amount of information on the distributed depth image. For example, in the case of an 8-bit depth image in comparison with in the case of a 16-bit depth image, the error of the three-dimensional model restored by video display terminal 117C increases; meanwhile, the distributed network load can be reduced.

If color information is added to points constituting a three-dimensional model, three-dimensional space reconstructing device 115C may generate a depth image and a texture image including the color information by projecting the points and the color information to the same plane as the imaging plane of at least one viewpoint. In this case, data transferor 119C may compress and distribute the depth image and the texture image. Furthermore, video display terminal 117C decodes the compressed depth image and texture image and generates a three-dimensional model and color information on points included in the three-dimensional model by using the at least one obtained depth image and texture image. Thereafter, video display terminal 117C generates a rendering image by using the generated three-dimensional model and color information.

The depth image and the texture image may be compressed by data transferor 119C or three-dimensional space reconstructing device 115C. Three-dimensional space reconstructing device 115C or data transferor 119C may distribute the foregoing background subtracted image that is generated by subtracting a background image from a captured image. In this case, video display terminal 117C may generate a three-dimensional model by using the background subtracted image and generate a rendering image by using the generated three-dimensional model.

Three-dimensional space reconstructing device 115C or data transferor 119C may distribute position information on the position of each model on a three-dimensional space. Thus, video display terminal 117C can easily combine models by using the received position information after the models are generated. For example, three-dimensional space reconstructing device 115C calculates the position information on the models by detecting points or the like on the three-dimensional space when the models are generated. Moreover, three-dimensional space reconstructing device 115C may detect a specific subject, e.g., an athlete in advance on a two-dimensionally captured image and specify the three-dimensional position of the subject (model) by using captured images and subject detection information.

The depth image is two-dimensional image information on a distance to a subject from a viewpoint. The pixels of the depth image store values indicating information on distances to the points of a three-dimensional model projected to the pixels. Information on depths does not always include images. Any information may be used as long as the information indicates distances to points constituting a three-dimensional model.

In the forgoing example, three-dimensional space reconstructing device 115C generates a depth image by temporarily generating a three-dimensional model from a background subtracted image or the like and projecting the three-dimensional model to each viewpoint. The present disclosure is not limited to this example. For example, three-dimensional space reconstructing device 115C may generate a three-dimensional model from an object other than an image by using LIDAR or the like and then generate a depth image from the three-dimensional model. Alternatively, three-dimensional space reconstructing device 115C may acquire, for example, a generated three-dimensional model from the outside and then generate a depth image from the acquired three-dimensional model.

Furthermore, three-dimensional space reconstructing device 115C may set a bit length in a depth image at a different value for each model. For example, three-dimensional space reconstructing device 115C may set the bit lengths of the first depth image and the second depth image at different values. Data transferor 119C may distribute information on the bit lengths of the first depth image and the second depth image to video display terminal 117C. For example, if the first model is a foreground model and the second model is a background model, three-dimensional space reconstructing device 115C sets the bit length of the first depth image of the foreground model, which requires higher model precision, at 16 bits and sets the bit length of the second depth image of the background model, which does not require high model precision, at 8 bits. This can preferentially allocate a bit length to the depth image of a part where models such as a foreground model need to be restored with high precision on video display terminal 117C; meanwhile, the amount of information on the distributed depth image is suppressed.

The depth image of a model that requires high precision may be distributed to video display terminal 117C by data transferor 119C, whereas the depth image of a model that does not require high precision may not be distributed to video display terminal 117C by data transferor 119C. For example, data transferor 119C distributes the first depth image of the foreground model to video display terminal 117C and does not distribute the second depth image of the background model to video display terminal 117C. In this case, a prepared background model is used by video display terminal 117C. This can reduce the amount of information on the distributed depth image, thereby suppressing the network load.

Video display terminal 117C may determine whether to use a three-dimensional model restored from a distributed depth image or a prepared three-dimensional model. For example, if video display terminal 117C is a high-performance terminal, video display terminal 117C restores three-dimensional models from the depth image of the distributed foreground model and the depth image of the background model and uses the obtained three-dimensional models for rendering, thereby generating a rendering image with a foreground and a background of high quality. If video display terminal 117C is a smartphone that is a low-performance terminal requiring suppressed power consumption, video display terminal 117C restores a foreground model from a distributed depth image and uses a prepared background model instead of a depth image distributed as a background model. This can generate a rendering image with a high-quality foreground while suppressing the throughput. In this way, three-dimensional models to be used are switched according to the throughput of video display terminal 117C, achieving balance between the quality of the rendering image and power consumption with a reduced throughput.

Figure 21:
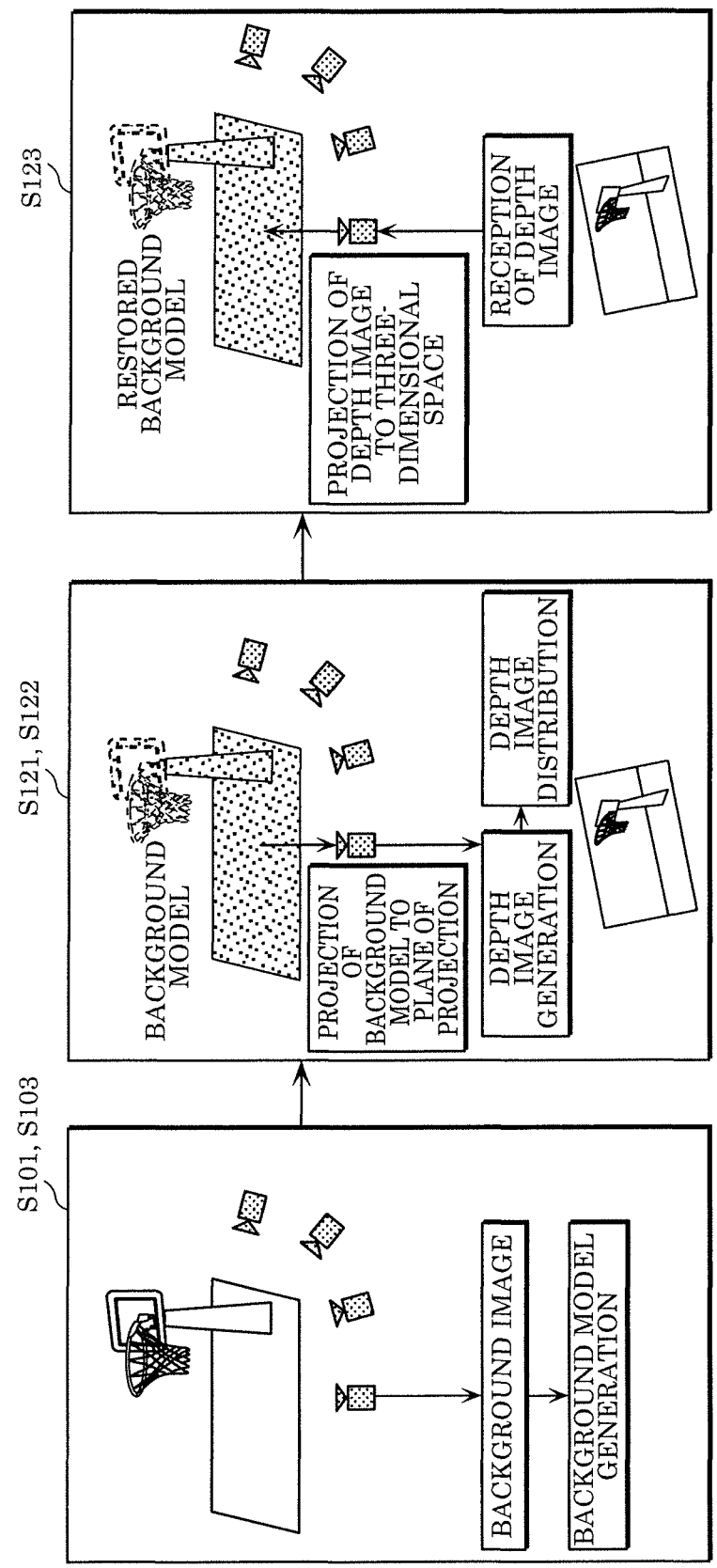
FIG. 21 is an explanatory drawing of the generation and restoration of a three-dimensional model according to embodiment 6.

A specific example of a method of generating and restoring a three-dimensional model will be described below. FIG. 21 is an explanatory drawing of the generation and restoration of a background model as a three-dimensional model.

First, three-dimensional space reconstructing device 115C generates the background model from a background image (S101, S103). For example, the detail of the processing is similar to that of step S111 shown in FIG. 7.

Subsequently, three-dimensional space reconstructing device 115C generates the depth image of viewpoint A from the points of the background model (S121). Specifically, three-dimensional space reconstructing device 115C calculates projection matrix A by using the camera parameter of viewpoint A. Three-dimensional space reconstructing device 115C then creates a depth image (distance image) by projecting the points of the background model to the plane of projection of viewpoint A by using projection matrix A.

At this point, two or more points may be projected to the same pixel in the depth image. In this case, for example, three-dimensional space reconstructing device 115C uses a value at a minimum distance from the plane of projection of viewpoint A as the pixel value of the depth image. This can prevent the entry of the depth value of a subject hidden behind a subject from viewpoint A, thereby correctly generating the depth image.

Data transferor 119C distributes the generated depth image (S122). At this point, data transferor 119C reduces the amount of data by applying standard two-dimensional image compression of H.264 or H.265 to the depth image. Data transferor 119C may compress the depth image according to the multi-view encoding mode in which a parallax between viewpoints is used.

Moreover, data transferor 119C distributes the camera parameter with the depth image. The camera parameter is used when the depth image is generated from the three-dimensional model. Data transferor 119C may distribute projection matrix A calculated using the camera parameter, instead of or in addition to the camera parameter.

Video display terminal 117C then restores the points of the background model by projecting the depth images of multiple viewpoints to a three-dimensional space (S123). At this point, video display terminal 117C may confirm whether the restored points and the viewpoints are free from error in a geometric positional relationship, and may optionally readjust the positions of the points. For example, video display terminal 117C matches feature points by using images between the viewpoints and adjusts the positions of the points so as to match the points for the respective matched feature points on a three-dimensional space. Thus, video display terminal 117C can precisely restore the three-dimensional model.

In this example, the background model is generated and restored. The same method is also applicable to other models such as a foreground model.

Figure 22:
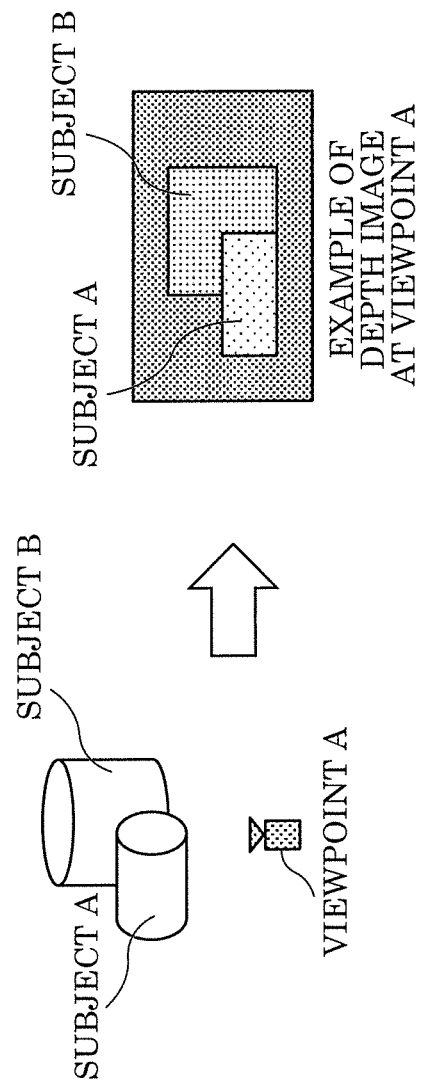
FIG. 22 shows an example of a depth image according to embodiment 6.

An example of the depth image will be described below. FIG. 22 shows an example of the depth image. Each pixel of the depth image indicates information on a distance to a subject. For example, the depth image is expressed by an 8-bit monochrome image. In this case, the shorter the distance from viewpoint A, the brighter the allocated value (a value close to 255), whereas the longer the distance from viewpoint A, the darker the allocated value (a value close to 0). In the example of FIG. 22, a bright value is allocated to subject A near viewpoint A, whereas a darker value is allocated to subject B remote from viewpoint A. The background is more remote than subject B and thus a value darker than that of subject B is allocated to the background.

In the depth image, a brighter value (a value close to 255) may be allocated as the distance from viewpoint A increases, whereas a darker value (a value close to 0) may be allocated as the distance from viewpoint A decreases. In the example of FIG. 22, information on distances to the subjects is expressed as the depth image. The information to be transmitted is not limited to this and may be in any format as long as distances to the subjects can be expressed. For example, information on distances to subjects A and B may be represented as text information or the like instead of images. In this example, the depth image has a length of 8 bits. The bit length is not limited to this and may be larger or smaller than 8 bits. If a value larger than 8 bits, for example, a 16-bit value is used, information on distances to the subjects can be more minutely reproduced. This can improve the accuracy of restoring a three-dimensional model on video display terminal 117C. Therefore, a three-dimensional model close to the three-dimensional model generated by three-dimensional space reconstructing device 115C can be restored on video display terminal 117C. The amount of information on the distributed depth image is increased, thereby increasing the network load.

If a value smaller than 8 bits, for example, a 4-bit value is used, information on distances to the subjects is roughly reproduced. This reduces the accuracy of restoring a three-dimensional model on video display terminal 117C. Therefore, an error increases between the restored three-dimensional model and the three-dimensional model generated by three-dimensional space reconstructing device 115C. The amount of information on the distributed depth image can be reduced, thereby suppressing the network load.

Three-dimensional space reconstructing device 115C may determine the bit length of the depth image based on whether a target application requires a three-dimensional model with high accuracy on video display terminal 117C. For example, if the target application does not depend on the quality of video after rendering, three-dimensional space reconstructing device 115C reduces the bit length of the depth image and preferentially suppresses the distributed network load. For example, if the target application depends on the quality of video, three-dimensional space reconstructing device 115C increases the bit length of the depth image. Three-dimensional space reconstructing device 115C preferentially improves the quality of the image after rendering even if the distributed network load increases.

Moreover, three-dimensional space reconstructing device 115C may adaptively change the bit length of the depth image according to the distributed network load. For example, in the case of a high network load, three-dimensional space reconstructing device 115C sets a short bit length so as to suppress the network load while reducing the accuracy of a three-dimensional model. In the case of a low network load, three-dimensional space reconstructing device 115C sets a long bit length so as to more minutely generate a three-dimensional model on video display terminal 117C. At this point, three-dimensional space reconstructing device 115C may store information on the bit length of the depth image in header information or the like and distribute the information with the depth image to video display terminal 117C. Thus, video display terminal 117C can be notified of the bit length of the depth image. Three-dimensional space reconstructing device 115C may add the information on the bit length of the depth image to each depth image, for a change of the bit length, or for each period, e.g., each random access point. The information may be added only to the first depth image or may be distributed at other timings.

Figure 23A:
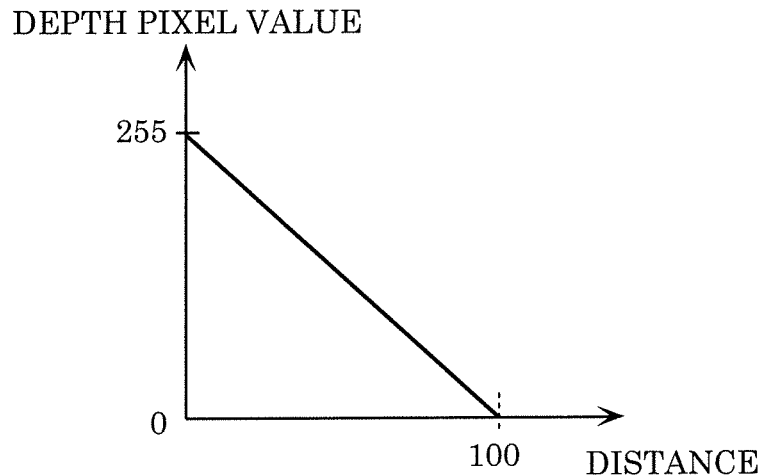
FIG. 23A shows an allocation example of pixel values in the depth image according to embodiment 6.
Figure 23B:
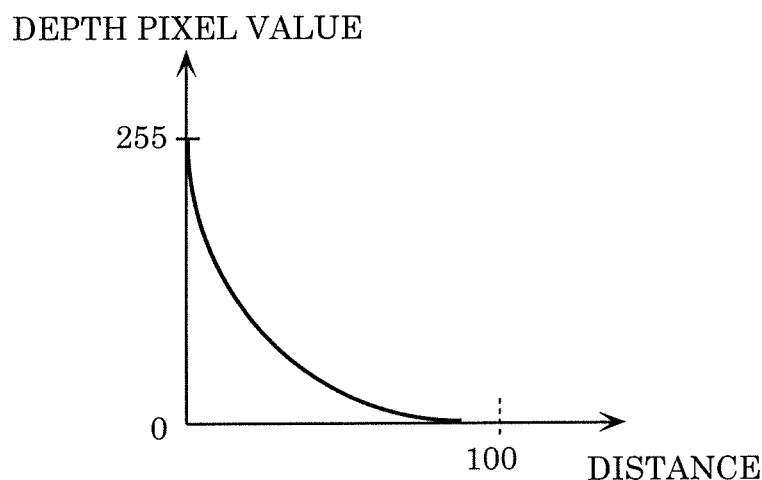
FIG. 23B shows an allocation example of pixel values in the depth image according to embodiment 6.
Figure 23C:
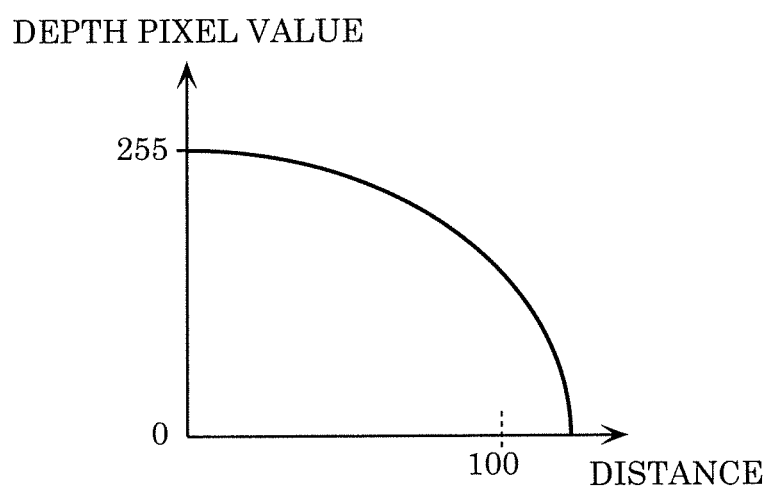
FIG. 23C shows an allocation example of pixel values in the depth image according to embodiment 6.

Examples of the allocation of pixel values in the depth image will be described below. FIGS. 23A, 23B, and 23C show first to third examples of the allocation of pixel values in the depth image.

In the first allocation method in FIG. 23A, values are linearly allocated to the pixel values (depth pixel values) of the depth image having an 8-bit length according to the distance.

In the second allocation method in FIG. 23B, values are allocated to the pixel values of the depth image having an 8-bit length preferentially for a subject at a short distance. This can improve the distance resolution of a subject at a short distance. Thus, the accuracy of the foreground model can be increased by using the second allocation method for the depth image of the foreground model. Three-dimensional space reconstructing device 115C may distribute information on the second allocation method (information on a pixel value corresponding to a distance) such that the information is included in header information or the like. Alternatively, the information may be determined in advance based on standards or the like and the same information may be used on the transmitting side and the receiving side.

In the third allocation method in FIG. 23C, values are allocated to the pixel values of the depth image having an 8-bit length preferentially for a subject at a long distance. This can improve the distance resolution of a subject at a long distance. Thus, the accuracy of the background model can be increased by using the third allocation method for the depth image of the background model. Three-dimensional space reconstructing device 115C may distribute information on the third allocation method (information on a pixel value corresponding to a distance) such that the information is included in header information or the like. Alternatively, the information may be determined in advance based on standards or the like and the same information may be used on the transmitting side and the receiving side.

Furthermore, three-dimensional space reconstructing device 115C may switch the allocation methods for each of the models. For example, three-dimensional space reconstructing device 115C may apply the second allocation method to the foreground model and the third allocation method to the background model.

At this point, three-dimensional space reconstructing device 115C may add information on which one of the first to third allocation methods is to be used, to header information or the like for each of the distributed models. Alternatively, the application of the allocation methods to the models may be determined in advance based on standards or the like.

Three-dimensional space reconstructing device 115C may add information on which one of the allocation methods determined in advance based on standards is to be used, to header information or the like.

As described above, three-dimensional space reconstructing device 115C or data transferor 119C generates a depth image from a three-dimensional model and distributes, to video display terminal 117C, the depth image and information for restoring the three-dimensional model from the depth image.

Video display terminal 117C receives the depth image generated from the three-dimensional model and the information for restoring the three-dimensional model from the depth image and restores the three-dimensional model from the depth image by using the information.

In this way, the three-dimensional model is not distributed as it is but the depth image generated from the three-dimensional model is distributed instead, thereby suppressing the amount of distributed data.

In the generation of the depth image, three-dimensional space reconstructing device 115C generates the depth image by projecting the three-dimensional model to the imaging plane of a predetermined viewpoint. For example, the information for restoring the three-dimensional model from the depth image includes a parameter for projecting the three-dimensional model to the imaging plane from the predetermined viewpoint.

For example, the information for restoring the three-dimensional model from the depth image is a camera parameter. Specifically, in the generation of the depth image, three-dimensional space reconstructing device 115C generates the depth image by projecting the three-dimensional model to the imaging plane of the viewpoint by using the camera parameter of the predetermined viewpoint. The information includes the camera parameter.

Moreover, the information includes a parameter for projecting the three-dimensional model to the imaging plane of the depth image. In the restoration, video display terminal 117C restores the three-dimensional model from the depth image by using the parameter.

For example, the information includes the camera parameter of the viewpoint of the depth image. In the restoration, video display terminal 117C restores the three-dimensional model from the depth image by using the camera parameter.

The information for restoring the three-dimensional model from the depth image may be a projection matrix. Specifically, in the generation of the depth image, three-dimensional space reconstructing device 115C calculates the projection matrix by using the camera parameter of the predetermined viewpoint and generates the depth image by projecting the three-dimensional model to the imaging plane of the viewpoint by using the projection matrix. The information includes the projection matrix.

The information includes the projection matrix. In the restoration, video display terminal 117C restores the three-dimensional model from the depth image by using the projection matrix.

For example, three-dimensional space reconstructing device 115C further compresses the depth image according to the two-dimensional image compression scheme and distributes the compressed depth image in the distribution. The depth image compressed according to the two-dimensional image compression scheme is decoded by video display terminal 117C.

Thus, in the distribution of the three-dimensional model, data can be compressed according to the two-dimensional image compression scheme. This eliminates the need for constructing another compression scheme for three-dimensional models, thereby easily reducing the amount of data.

For example, in the generation of the depth image, three-dimensional space reconstructing device 115C generates a plurality of depth images from different viewpoints from the three-dimensional model. In the compression, three-dimensional space reconstructing device 115C compresses the depth images according to the relationship between the depth images.

In the reception, video display terminal 117C receives the depth images. In the decoding, video display terminal 117C decodes the depth images according to the relationship between the depth images.

This can further reduce the amount of data of the depth images according to, for example, the multi-view encoding mode in the two-dimensional image compression scheme.

For example, three-dimensional space reconstructing device 115C further generates a three-dimensional model by using a plurality of images captured by imaging devices 121 and distributes the images to video display terminal 117C. The viewpoint of the depth image is the viewpoint of one of the images.

Video display terminal 117C receives the images and generates a rendering image by using the three-dimensional model and the images. The viewpoint of the depth image is the viewpoint of one of the images.

In this way, the viewpoint of the depth image is matched with the viewpoint of the captured image, allowing three-dimensional space reconstructing device 115C to calculate parallax information between the captured images by using the depth image and generate a predicted image between the viewpoints by using the parallax information if the captured images are compressed by multi-view encoding. This can reduce the encoding amount of the captured image.

For example, three-dimensional space reconstructing device 115C further determines the bit length of each pixel included in the depth image and distributes information on the bit length.

Video display terminal 117C then receives the information on the bit length of each pixel included in the depth image.

This can switch bit lengths according to the subject or the purpose of use, thereby properly reducing the amount of data.

For example, three-dimensional space reconstructing device 115C determines the bit length according to a distance to a subject.

For example, three-dimensional space reconstructing device 115C further determines the relationship between a pixel value expressed by the depth image and a distance and distributes information on the determined relationship to video display terminal 117C.

Video display terminal 117C further receives the information on the relationship between a pixel value expressed by the depth image and a distance.

This can change the relationship between a pixel value and a distance according to the subject or the purpose of use, thereby improving the accuracy of the restored three-dimensional model.

For example, the three-dimensional model includes a first model (e.g., a foreground model) and a second model (e.g., a background model) that makes a smaller change per unit time than the first model. The depth image includes the first depth image and the second depth image. In the generation of the depth image, three-dimensional space reconstructing device 115C generates the first depth image from the first model and the second depth image from the second model. In the determination of the relationship, three-dimensional space reconstructing device 115C determines a first relationship between a pixel value expressed by the first depth image and a distance and a second relationship between a pixel value expressed by the second depth image and a distance. In the first relationship, a distance resolution in a first distance range (short distance region) is higher than a distance resolution in a second distance range (long distance region) that is more remote than the first distance range (FIG. 23B). In the second relationship, a distance resolution in the first distance range (short distance region) is lower than a distance resolution in the second distance range (long distance region) (FIG. 23C).

For example, color information is added to the three-dimensional model. Three-dimensional space reconstructing device 115C further generates a texture image from the three-dimensional model, compresses the texture image according to the two-dimensional image compression scheme, and distributes the compressed texture image in the distribution.

Video display terminal 117C further receives the compressed texture image according to the two-dimensional image compression scheme, decodes the compressed texture image, and restores the three-dimensional model with the added color information by using the decoded depth image and the decoded texture image in the restoration.

Although a three-dimensional space recognizing system, a free-viewpoint video generating system, and a next-generation monitoring system according to the embodiments of the present disclosure have been described above, the present disclosure is not limited to such embodiments.

Note that each of the processing units included in the three-dimensional space recognizing system, the free-viewpoint video generating system, and the next-generation monitoring system according to the embodiments is implemented typically as a large-scale integration (LSI), which is an integrated circuit (IC). They may take the form of individual chips, or one or more or all of them may be encapsulated into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

Also, the present disclosure may be embodied as various methods performed by the three-dimensional space recognizing system, the free-viewpoint video generating system, and the next-generation monitoring system.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

Although the three-dimensional space recognizing system, the free-viewpoint video generating system, and the next-generation monitoring system according to one or more aspects has been described on the basis of the embodiments, the present disclosure is not limited to such embodiments. The one or more aspects may thus include forms obtained by making various modifications to the above embodiments that can be conceived by those skilled in the art, as well as forms obtained by combining structural components in different embodiments, without materially departing from the spirit of the present disclosure.

INDUSTRIAL APPLICABILITY

The present disclosure is applicable to a three-dimensional space recognizing system, a free-viewpoint video generating system, and a next-generation monitoring system.

What is claimed is:

1. A three-dimensional model distribution method, comprising:
    setting a first bit length that is a total number of bits representing a depth value of each of first pixels included in a first depth image corresponding to a first model included in a three-dimensional model;
    setting a second bit length to a value different from a value of the first bit length, the second bit length being a total number of bits representing a depth value of each of second pixels included in a second depth image corresponding to a second model that makes a smaller change per unit time than the first model;
    generating the first depth image and the second depth image from the three-dimensional model, the first depth image being represented by the first bit length set and the second depth image being represented by the second bit length set; and
    distributing the first depth image, the second depth image, and information for restoring the three-dimensional model from the first depth image and the second depth image.

2. The three-dimensional model distribution method according to claim 1, further comprising:
    compressing each of the first depth image and the second depth image according to a two-dimensional image compression scheme,
    wherein in the distributing, the first depth image compressed and the second depth image compressed are distributed.

3. The three-dimensional model distribution method according to claim 2,
    wherein color information is added to the three-dimensional model,
    the three-dimensional model distribution method further comprises:
    generating a texture image from the three-dimensional model; and
    compressing the texture image according to the two-dimensional image compression scheme, and
    in the distributing, the texture image compressed is further distributed.

4. The three-dimensional model distribution method according to claim 1, further comprising:
    generating the three-dimensional model by using a plurality of images captured by a plurality of imaging devices; and
    distributing the plurality of images,
    wherein a viewpoint of each of the first depth image and the second depth image is a viewpoint of one of the plurality of images.

5. The three-dimensional model distribution method according to claim 1,
    wherein in the generating of the first depth image and the second depth image, the first depth image and the second depth image are generated by projecting the three-dimensional model to an imaging plane of a predetermined viewpoint, and
    the information includes a parameter for projecting the three-dimensional model to the imaging plane of the predetermined viewpoint.

6. The three-dimensional model distribution method according to claim 1, further comprising:
    distributing information indicating the first bit length and the second bit length.

7. The three-dimensional model distribution method according to claim 1, further comprising:
    determining a first relationship between distances and pixel values expressed by the first depth image and a second relationship between distances and pixel values expressed by the second depth image; and
    distributing information on the first relationship determined and the second relationship determined.

8. The three-dimensional model distribution method according to claim 7,
    wherein
    in the first relationship, a distance resolution in a first distance range is higher than a distance resolution in a second distance range that is more remote than the first distance range, and
    in the second relationship, a distance resolution in the first distance range is lower than a distance resolution in the second distance range.

9. The three-dimensional model distribution method according to claim 1,
    wherein the first bit length is longer than the second bit length.

10. The three-dimensional model distribution method according to claim 1,
    wherein the first bit length is shorter than the second bit length.

11. The three-dimensional model distribution method according to claim 1,
    wherein a distance between a viewpoint of each of the first depth image and the second depth image and an object included in the first model is shorter than a distance between the viewpoint and an object included in the second model.

12. A three-dimensional model receiving method, comprising:
    receiving a first depth image, a second depth image generated from a three-dimensional model including a first model and a second model that makes a smaller change per unit time than the first model, first information for restoring the three-dimensional model from the first depth image and the second depth image, and second information indicating a first bit length that is a total number of bits representing a depth value of each of first pixels included in the first depth image and a second bit length that is a total number of bits representing a depth value of each of second pixels included in the second depth image, the first depth image corresponding to the first model and the second depth image corresponding to the second model; and
    restoring the three-dimensional model from the first depth image and the second depth image by using the first information,
    wherein
    the first depth image received is represented by the first bit length, the second depth image received is represented by the second bit length, and the second bit length is set to a value different from a value of the first bit length.

13. The three-dimensional model receiving method according to claim 12,
wherein each of the first depth image and the second depth image is compressed according to a two-dimensional image compression scheme, and
the three-dimensional model receiving method further comprises decoding the first depth image compressed and the second depth image compressed.

14. The three-dimensional model receiving method according to claim 13, further comprising:
receiving a texture image compressed according to the two-dimensional image compression scheme; and
decoding the texture image compressed,
wherein in the restoring, the three-dimensional model with added color information is restored by using the first depth image decoded, the second depth image decoded, and the texture image decoded.

15. The three-dimensional model receiving method according to claim 12, further comprising:
generating a rendering image by using the three-dimensional model and a plurality of images,
wherein a viewpoint of each of the first depth image and the second depth image is a viewpoint of one of the plurality of images.

16. The three-dimensional model receiving method according to claim 12,
wherein the first information includes a parameter for projecting the three-dimensional model to an imaging plane of the depth image, and
in the restoring, the three-dimensional model is restored from the first depth image and the second depth image by using the parameter.

17. The three-dimensional model receiving method according to claim 12, further comprising:
receiving information on a first relationship between distances and pixel values expressed by the first depth image and a second relationship between distances and pixel values expressed by the second depth image.

18. The three-dimensional model receiving method according to claim 12,
wherein the first bit length is longer than the second bit length.

19. The three-dimensional model receiving method according to claim 12,
wherein the first bit length is shorter than the second bit length.

20. The three-dimensional model receiving method according to claim 12,
wherein a distance between a viewpoint of each of the first depth image and the second depth image and an object included in the first model is shorter than a distance between the viewpoint and an object included in the second model.

21. A three-dimensional model distribution device, comprising:
a non-transitory memory storing one or more programs; and
a processor configured to execute the one or more programs to:
set a first bit length that is a total number of bits representing a depth value of each of first pixels included in a first depth image corresponding to a first model included in a three-dimensional model;
set a second bit length to a value different from a value of the first bit length, the second bit length being a total number of bits representing a depth value of each of second pixels included in a second depth image corresponding to a second model that makes a smaller change per unit time than the first model;
generate the first depth image and the second depth image from the three-dimensional model, the first depth image being represented by the first bit length set and the second depth image being represented by the second bit length set; and
distribute the first depth image, the second depth image, and information for restoring the three-dimensional model from the first depth image and the second depth image.

22. A three-dimensional model receiving device, comprising:
a non-transitory memory storing one or more programs; and
a processor configured to execute the one or more programs to:
receive a first depth image, a second depth image generated from a three-dimensional model including a first model and a second model that makes a smaller change per unit time than the first model, first information for restoring the three-dimensional model from the first depth image and the second depth image, and second information indicating a first bit length that is a total number of bits representing a depth value of each of first pixels included in the first depth image and a second bit length that is a total number of bits representing a depth value of each of second pixels included in the second depth image, the first depth image corresponding to the first model and the second depth image corresponding to the second model; and
restore the three-dimensional model from the first depth image and the second depth image by using the first information,
wherein, the first depth image received is represented by the first bit length,
the second depth image received is represented by the second bit length, and
the second bit length is set to a value different from a value of the first bit length.

* * * * *